(12) United States Patent
Romano et al.

(10) Patent No.: US 9,542,382 B2
(45) Date of Patent: *Jan. 10, 2017

(54) CALL FLOW AND DISCOURSE ANALYSIS

(71) Applicant: Verint Systems Ltd., Herzilya Pituach (IL)

(72) Inventors: Roni Romano, Even Yehuda (IL); Rahm Fehr, Herzilya Pituach (IL)

(73) Assignee: VERINT SYSTEMS LTD., Herzilya Pituach (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/951,546

(22) Filed: Nov. 25, 2015

(65) Prior Publication Data

US 2016/0154782 A1  Jun. 2, 2016

Related U.S. Application Data

(63) Continuation of application No. 14/529,101, filed on Oct. 30, 2014, now Pat. No. 9,232,063.

(60) Provisional application No. 61/898,287, filed on Oct. 31, 2013, provisional application No. 61/932,469, filed on Jan. 28, 2014.

(51) Int. Cl.
| | |
|---|---|
| *H04M 3/00* | (2006.01) |
| *H04M 5/00* | (2006.01) |
| *G06F 17/27* | (2006.01) |
| *H04M 3/51* | (2006.01) |
| *H04M 3/42* | (2006.01) |
| *H04M 3/22* | (2006.01) |
| *G06N 5/02* | (2006.01) |
| *G06N 99/00* | (2010.01) |

(52) U.S. Cl.
CPC ......... *G06F 17/271* (2013.01); *G06F 17/2785* (2013.01); *H04M 3/2218* (2013.01); *H04M 3/42221* (2013.01); *H04M 3/5175* (2013.01); *H04M 3/5183* (2013.01); *G06N 5/022* (2013.01); *G06N 99/005* (2013.01); *H04M 2203/2038* (2013.01)

(58) Field of Classification Search
USPC .............................. 379/265.09; 704/231, 257
See application file for complete search history.

(56) References Cited

U.S. PATENT DOCUMENTS

| | | |
|---|---|---|
| 6,600,821 B1 | 7/2003 | Chan et al. |
| 7,912,701 B1 | 3/2011 | Gray et al. |
| 2014/0074477 A1 | 3/2014 | Bangalore et al. |

*Primary Examiner* — Quynh Nguyen
(74) *Attorney, Agent, or Firm* — Meunier Carlin & Curfman

(57) ABSTRACT

The disclosed solution uses machine learning-based methods to improve the knowledge extraction process in a specific domain or business environment. By formulizing a specific company's internal knowledge and terminology, the ontology programming accounts for linguistic meaning to surface relevant and important content for analysis. Based on the self-training mechanism developed by the inventors, the ontology programming automatically trains itself to understand the business environment by processing and analyzing a defined corpus of communication data. For example, the disclosed ontology programming adapts to the language used in a specific domain, including linguistic patterns and properties, such as word order, relationships between terms, and syntactical variations. The disclosed system and method further relates to leveraging the ontology to assess a dataset and conduct a funnel analysis to identify patterns, or sequences of events, in the dataset.

20 Claims, 14 Drawing Sheets

FIG. 12

AUTOMATED CALL SCORING

| INITIATIVES | DEFINITION | HOW SCORED | APPROPRIATE ON... |
|---|---|---|---|
| CUSTOMER STATED INTENT TO DISCONNECT CABLE<br><br>7-1-13 (1101) | DID THE CUSTOMER SAY ANY OF THE MAGIC WORDS (CANCEL, DISCONNECT, REMOVE, COMPETITOR) TO INDICATE THEY WANTED TO DISCONNECT THEIR CABLE SERVICE? | 'Y' IF THE CUSTOMER INDICATED WANTED TO DISCONNECT<br><br>'N' IF CUSTOMER MADE NO REQUEST TO DISCONNECT<br><br>N/A IS NOT AN APPROPRIATE ANSWER | REQUIRED ON ALL CALLS SCORED IN THE FOLLOWING GATES<br>•MUTLI RETENTION<br>•CABLE RETENTION<br>•VENDORS MULTI RETENTION<br>•VENDORS CABLE RETENTION |
| FREE RECEIVER WAS THE LEAD RETENTION OFFER<br><br>7-1-13 (1102) | IF THE CUSTOMER HAS REQUESTED TO DISCONNECT THEIR CABLE WAS THE REP'S LEAD OFFER TO SAVE THE SERVICE BY OFFERING A FREE RECEIVER<br><br>SCORE YES IF THE RECEIVER WAS THE LEAD RETENTION OFFER<br><br>SCORE NO IF THE RECEIVER WAS NOT THE LEAD RETENTION OFFER | 'Y' IF FREE RECEIVER WAS THE LEAD RETENTION OFFER<br><br>'N' IF FREE RECEIVER WAS NOT THE LEAD RETENTION OFFER<br><br>N/A IS NOT AN APPROPRIATE | REQUIRED ON ALL CALLS WHERE THE CUSTOMER REQUESTED TO DISCONNECT THEIR CABLE SERVICE |
| FREE RECEIVER WAS THE FALL BACK RETENTION OFFER<br><br>7-1-13 (1103) | IF THE CUSTOMER HAS REQUESTED TO DISCONNECT THEIR CABLE WAS THE REP'S SECONDARY OR ANY SUBSEQUENT RETENTION OFFER (ANYTHING BUT THE LEAD OFFER) TO SAVE THE SERVICE BY OFFERING A FREE RECEIVER<br><br>SCORE YES IF THE RECEIVER WAS THE SECONDARY RETENTION OFFER<br><br>SCORE NO IF THE RECEIVER WAS NOT THE SECONDARY RETENTION OFFER | 'Y' IF FREE RECEIVER WAS THE SECONDARY RETENTION OFFER<br><br>'N' IF FREE RECEIVER WAS NOT THE SECONDARY RETENTION OFFER<br><br>N/A IS NOT AN APPROPRIATE | REQUIRED ON ALL CALLS WHERE THE CUSTOMER REQUESTED TO DISCONNECT THEIR CABLE SERVICE |

CALL FLOW AND DISCOURSE ANALYSIS

CROSS-REFERENCE TO RELATED APPLICATIONS

The present application is a continuation of U.S. patent application Ser. No. 14/529,101, filed Oct. 30, 2014, entitled "CALL FLOW AND DISCOURSE ANALYSIS", which claims priority to U.S. Provisional Patent Application Nos. 61/898,287, filed Oct. 31, 2013, entitled "THEME-BASED FUNNEL ANALYSIS," and 61/932,469, filed Jan. 28, 2014, entitled "CALL FLOW AND DISCOURSE ANALYSIS," the disclosures of which are incorporated by reference in their entireties.

BACKGROUND

The present disclosure relates to the field of automated data processing. More specifically, the present disclosure is related to the automated analysis of call flow using discourse analysis. Discourse analysis applies the concept of dialog acts in order to identify the function of an utterance within a larger dialog. By identifying these functions, the functions can be sequentially mapped in order to analyze the flow of a dialog on a functional level. The present disclosure also relates to the field of automated data processing, and more specifically to the application of ontology programming to process and analyze communication data.

Analysis of a dialog on a functional level rather than a contextual level can then be leveraged to identify areas of a dialog for further contextual analysis, or to identify functional relationships between dialogs in a database or a corpus of dialogs to be analyzed as a group.

Analysis of a dialog on a functional level rather than a contextual level can then be leveraged to identify areas of a dialog for further contextual analysis, or to identify functional relationships between dialogs in a database or a corpus of dialogs to be analyzed as a group.

The term Dialog Act (DA) is used to denote some "function" of an utterance in a dialog. The goal behind the identification of dialog acts is to extract useful information from dialogs. The information is not at the level of syntax or semantics, but at a higher level related to the dialog structure and to the intentions of the speakers. Dialogue acts provide a useful way of characterizing dialogue behaviors in human-human dialogue. Identifying whether an utterance is a statement, question, greeting, and so forth is integral to effective automatic understanding of natural dialog.

An ontology is a formal representation of a set of concepts, and the relationships between those concepts in a defined domain. The ontology models the specific meanings of terms as they apply to that domain, and may be devised to incorporate one or several different spoken and/or written languages. Communication data may exist in the form of an audio recording, streaming audio, a transcription of spoken content, or any written correspondence or communication. In the context of a customer service interaction, the communication data may be a transcript between a customer service agent or interactive voice response (IVR) recording with a customer/caller. The interaction may be via phone, via email, via internet chat, via text messaging, etc. An ontology can be developed and applied across all types of communication data, for example, all types of customer interactions (which may include interactions in multiple languages), to develop a holistic tool for processing and interpreting such data.

Prior art data analysis systems and methods require manual data analysis to determine context and identify contextual patterns. For example, in a call center environment, calls are typically analyzed manually by a user listening to the call to determine the tone, context, and resulting success of the call. In one exemplary situation, prior art systems and software for analyzing call center data to assess the success of retention attempts by customer service representatives to retain customers who call intending to discontinue a product or service require a user to listen to calls, or portions of calls, to determine how the representative attempted to retain the customer and the success of that attempt. Currently, large companies have teams of people manually reviewing data to assess such call flows and success/failure rates.

SUMMARY

The disclosed solution uses machine learning-based methods to improve the knowledge extraction process in a specific domain or business environment. By formulizing a specific company's internal knowledge and terminology, the ontology programming accounts for linguistic meaning to surface relevant and important content for analysis. Based on the self-training mechanism developed by the inventors, the ontology programming automatically trains itself to understand the business environment by processing and analyzing a defined corpus of communication data. For example, the disclosed ontology programming adapts to the language used in a specific domain, including linguistic patterns and properties, such as word order, relationships between terms, and syntactical variations. The disclosed system and method further relates to leveraging the ontology to assess a dataset and conduct a funnel analysis to identify patterns, or sequences of events, in the dataset.

The premise on which the ontology is built is that meaningful terms are detected in the corpus and then classified according to specific semantic concepts, or entities. Once the main terms are defined, direct relations or linkages can be formed between these terms and their associated entities. Then, the relations are grouped into themes, which are groups or abstracts that contain synonymous relations. Relations are detected in interactions and surfaced during the system's self-training process. A theme is essentially a single concept defined by its associated relations, which represent that same concept among multiple interactions in the corpus. Themes provide users with a compressed view of the characteristics of interactions throughout the corpus. Themes may be identified according to the exemplary methods described herein.

Themes provide a basis for analytic functions of the ontological software, and these analytical functions can be performed automatically without the need for a user to provide detailed human oversight or involvement. For example, themes provide a basis for automatically analyzing conceptual patterns and/or sequences of events in a dataset. Once such sequences have been identified, the sequences can be further automatically analyzed to extract useful information about the sequences, such as data relating particular sequences to desired outcomes. In data relating to a call center environment, for example, call flows can be identified, which are sequences of conversation, or conversational topics, of interest to a user. In one exemplary analytical scenario, those sequences can be analyzed to determine how successful certain call sequences were at effectuating desired customer behavior, such as purchasing a new product or upgrading a service.

The present software system and method provides such call flow and success rate analysis automatically and without the need for users to engage in the time consuming and laborious process of manually reviewing data. Further, the present system and method can quickly and easily provide comprehensive analytical data regarding an entire data set, or any subset thereof, including resource allocation and the dollar value associated with particular methods or actions, to determine successful and cost effective practices within a user company. Thereby, companies can maximize their resources. For instance, again assessing a call center example, a company can utilize the present systems and methods to drive down the cost of running the call center while maximizing the profit that can be made therefrom.

BRIEF DESCRIPTION OF THE DRAWINGS

FIG. 12 provides an exemplary logic table demonstrating one embodiment of an analytics module applying a funnel analysis.

DETAILED DISCLOSURE

In the context of customer service interactions, spoken content may exist as various forms of data, including but not limited to audio recording, streaming audio and transcribed textual transcript. While the present disclosure will exemplarily feature the analysis of actual transcripts, it is to be understood that in alternative embodiments audio recordings or streaming audio may be used or analyzed. In some such embodiment, the audio recording or streaming audio data may be first transcribed and then processed as disclosed herein as textual transcript.

Audio data from a customer interaction between a customer service agent/IVR and a customer/caller can be automatedly transcribed into a textual file through speech recognition techniques. However, challenges exist in automatedly interpreting the content and sentiments conveyed in the customer service interaction. An ontology, which generally refers to a collection of entities and their relations, is one way in which an automated interpretation of an interaction, exemplarily a customer service interaction, can be developed, organized, and presented as disclosed herein.

An ontology as disclosed is a formal representation of a set of concepts and the relationships between these concepts. In general, an ontology will focus on a specific domain or general context within which the individualized terms or classes as described herein are interpreted. As a non-limiting example, the ontology described herein are with respect to customer service interactions. The ontology may be defined to more specific domains, including but not limited to, financial services, consumer products, subscription services, or some other service interactions.

Generally, an ontology as disclosed herein include terms which are individual words or short phrases that represent the basic units or concepts in the customer service interaction. Non-limiting examples of terms, as used herein, include "device", "iPhone", "iPhone four", "invoice", "I", "she", "bill", "cancel", "upgrade", "activate", "broken", or "cell phone", "customer care", or "credit card." However, these are not intended to be limiting in any manner and are merely exemplary of basic units or concepts that may be found in a customer service interaction.

Classes are broader concepts that encapsulate or classify a set of terms. Classes describe semantic concepts to which classified terms are related. It is also to be understood that classes may also classify or encapsulate a set of subclasses in which the terms are classified. Non-limiting examples of classes, may be include "objects", "actions", "modifiers", "documents", "service", "customers", or "locations". However, these are not intended to be limiting on the types of classes, particularly the types of classes that may appear in an ontology directed to a specific or specialized domain.

Figure 2:
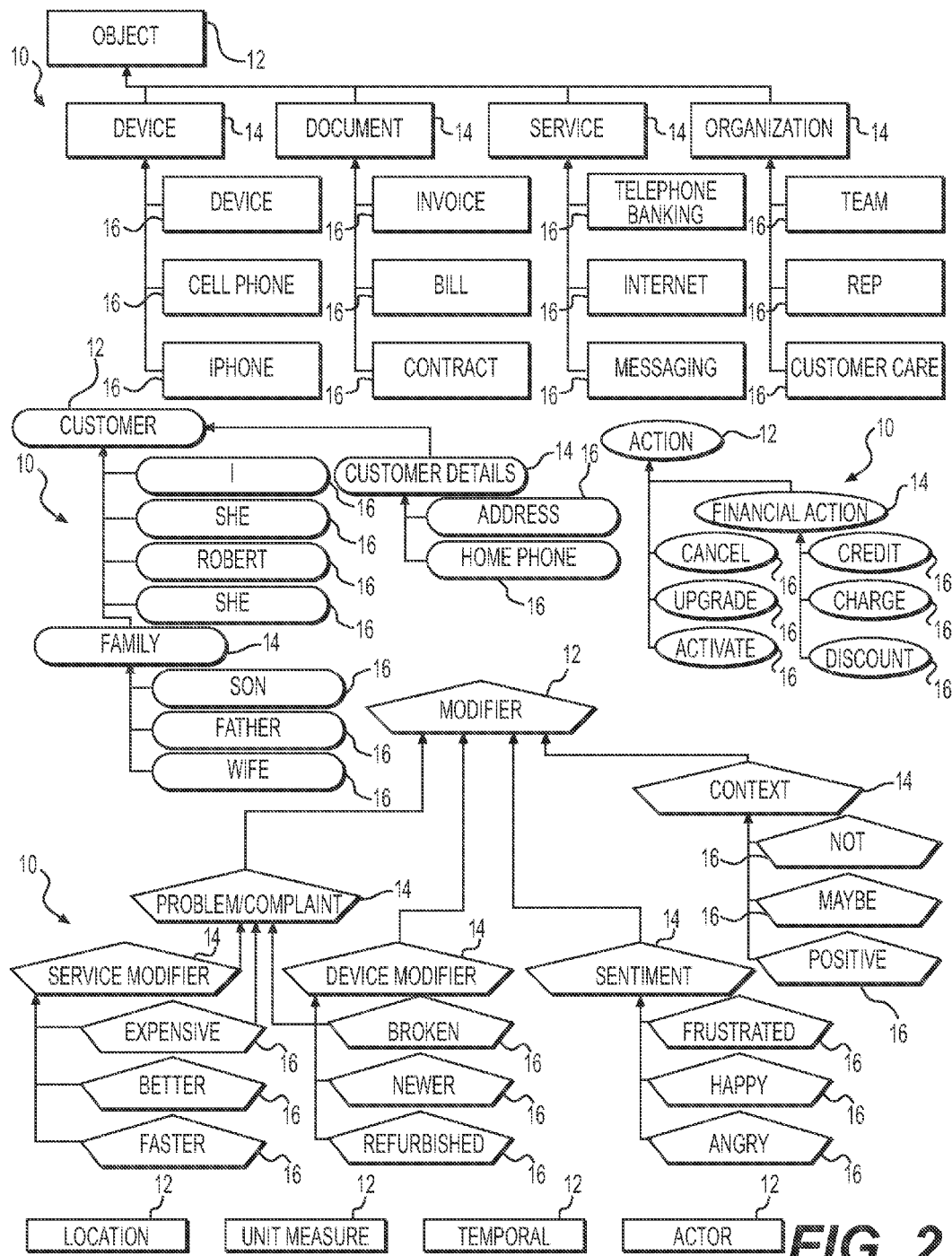
FIG. 2 depicts examples of hierarchical presentations of automatedly developed ontologies.

The classes, subclasses, and terms are connected by a plurality of relations which are defined binary directed relationships between terms and classes/subclasses or subclasses to classes. In a non-limiting example, the term "pay" is defined under the class "action" and the term "bill" is defined in the class "documents". Still further binary directed relationships can be defined between these class/term pairs. The action/pay pair is related to the document/bill pair in that the payment action requires an underlying document, which may be a bill. In another non-limiting example, the term "broken" is defined in the class "problems" and the term "iPhone" is defined in the class "device". The problem/broken pair can also have a directed relationship to the "devices" class in which the "iPhone" term is a specific example as represented by the devices/iPhone pair. FIG. 2 depicts exemplary, non-limiting embodiments of ontology 10, including classes 12, subclasses 14, and terms 16. The arrow between the terms/classes/subclasses represent some relations that may exist in the ontology.

Figure 1:
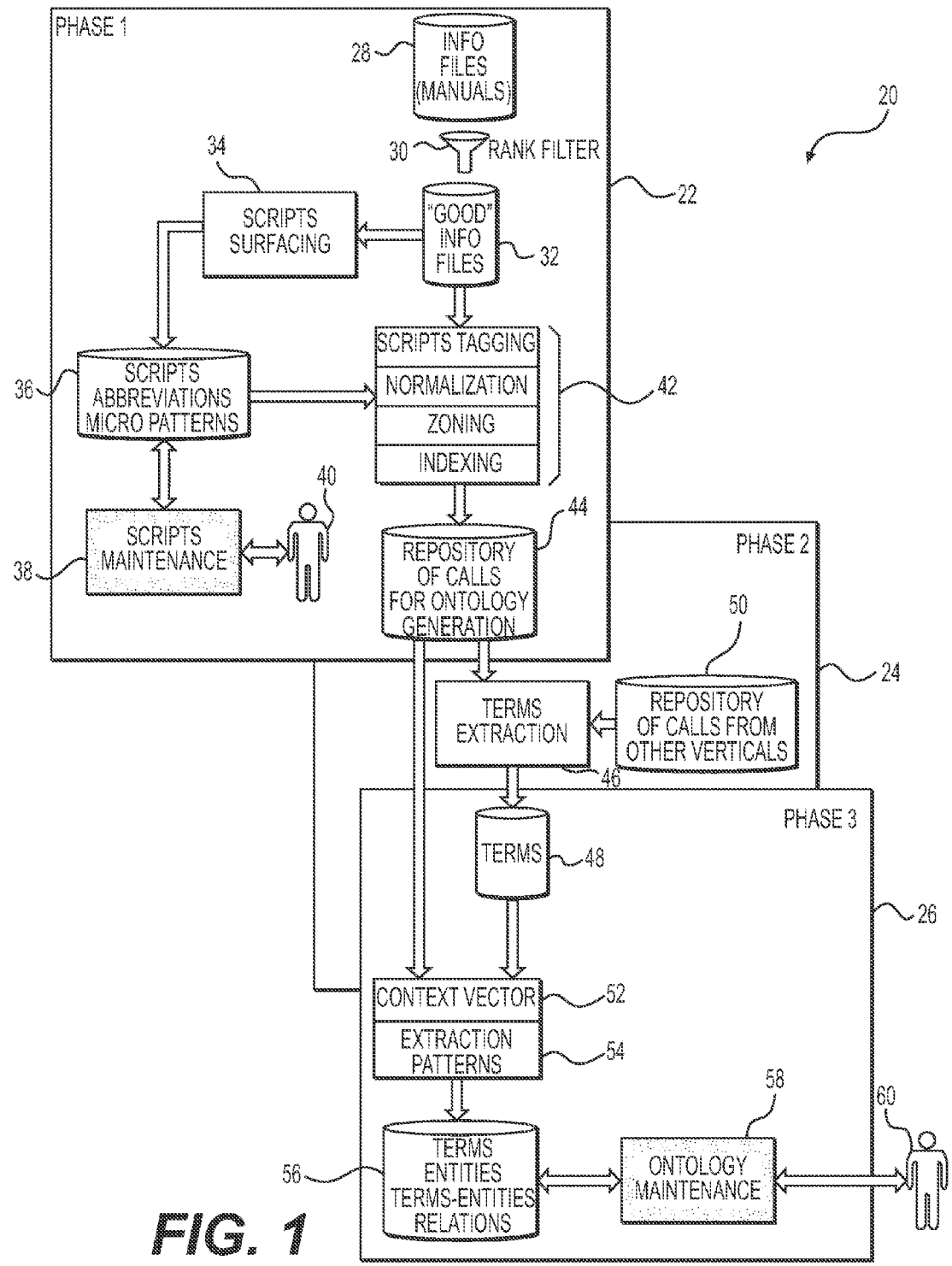
FIG. 1 is a schematic diagram of an embodiment of a process for ontology development.

FIG. 1 is a schematic diagram of an exemplary process to develop an ontology for customer service interactions. The process 20 can be divided into three exemplary phases, namely the corpus processing 22, the term identification 24 and ontology generation 26.

The corpus processing at 22 begins with a data base of raw data which may include, customer service interactions such as transcriptions of customer service interactions and other information files such as customer service agent scripts, service manuals, product manuals, or the like. The corpus provided at 28 is filtered by a rank filter at 30 which may be used to create a subset of the corpus stored at 32 which has been identified through the rank filter at 30 to be related or instructive to the domain of the ontology that is to be developed, which in the present example is customer service interactions. In a non-limiting embodiment, the rank filter includes a statistical analysis of the terms that appear in the data stored at 28 and the filter selects those data files that include specific threshold of identified related terms or statistically significant terms.

The filtered data files at 32 are used to identify scripts at 34. Scripts are sequences of a predefined number of words that commonly or repeatedly occur in the filtered data. In a non-limiting example, scripts are identified at 34 by dividing the filtered data to utterances which are consecutive sequences of words spoken by one speaker in a conversation without interference from another speaker or any event. Utterances may exemplarily result from a customer service agent or from the use of IVR. Scripts can be identified by sequences of text that follow a predetermined script identification rule. A non-limiting example of a rule to identify an agent script can exemplarily be a sequence of more than x (where x is a parameter) number of words occurring more than y (where y is a parameter) times per million utterances in the filtered files where some range of tolerance for missing or additional words in the sequence is provided. A non-limiting example of a rule to identify an IVR script may be a sequence of more than x (where x is a parameter) words that is characterized by the constant distribution of word length and distances between particular words in the sequence. In addition to the identification of full scripts from the filtered data, other templates may be identified. These templates may be the identification of abbreviations and the associated meaning of such abbreviations, or the identification of micropatterns in the filtered data. Micropatterns are similar to scripts, but are typically shorter and may occur in the utterances of either an agent or a customer where the micropattern expresses sub-sequences of words that indicate the existence of other information in close proximity to a micropattern in the customer service interaction. Non-limiting examples of micropatterns may be sequences of numbers, such as may indicate a date, a price, a telephone number, or a credit card number. Non-limiting examples of these may include that a telephone number is 10 numerical digits typically expressed in a three-three-four pattern while a credit card number is a 16 digit number that is often expressed in a four-four-four-four number pattern.

Identified scripts, abbreviations, and/or micropatterns may all be stored at 36 for use in the processes as described herein. The scripts, abbreviations and/or micropatterns stored at 36 also come from other data processing sources, and script maintenance processes 38 where the information stored at 36 is updated to reflect emerging issues, topics, or trends. The script maintenance at 38 may be an automated, semi-automated, or manual process that may involve the review and/or input from a user 40 to evaluate the data stored at 36.

The scripts, abbreviations, and/or micropatterns stored at 36 are also used to process at 42 each of the files from the filtered data 32. The processing at 42 may include, but is not limited to script tagging, normalization, zoning and/or indexing. Each of these techniques represent manners in which a data file can be preprocessed to provide additional information regarding the data files for use in facilitating further aspects of the process as described herein. As a result of the processing at 42, features in the data files such as utterances, meaning units, call segments, categories, and dialog acts may be identified within the data files and these processed data files are stored at 44.

In examples as disclosed herein, utterances are consecutive sequences of words spoken by one speaker in a conversation without interference by another speaker or another event. Meaning units divide utterances into a basic segment of meaning or the equivalent of a sentence, when narrated text is compared to written text. A meaning unit may be a sequence of words spoken by one speaker in a conversation without interference. In some embodiments, the meaning unit may include some level of speaker interference, e.g. very short acknowledgement statements by the other speaker. All terms in the meaning unit are linked within the boundaries of the meaning unit. A call segment is a set of utterances within a call, usually consecutive utterances, that are related to a specific topic. Non-limiting examples of call segments may include, call beginning, customer detail verification, call reason, problem description, problem resolution, and call finalization. A dialog act is related to a call segment in that the dialog act indicates some intention of the speaker or denotes a function or purpose of an utterance or meeting unit within the customer service interaction. Non-limiting examples of dialog acts may include an identification whether a utterance/meaning unit is a statement, question, greeting, or such.

As will be disclosed in further detail herein, meaning units can be categorized among dialog acts which define the function or purpose of that meaning unit within the interaction. The identification of the dialog act can provide further information and context which can facilitate the automated interpretation of an interaction.

After the corpus processing 22 has been completed, the process continues with term identification or extraction at 24. In the term identification at 24, the individual terms, such as described above, are identified or broken out at 46 from the customer service interactions stored at 44. As noted above, the terms are basic units of the call data which represent a single concept. The identified terms are stored at 48. It is to be noted that in the term identification at 24, other sources 50 of customer service interactions may be introduced to the process at this time for ontology development.

The final phase of the process is ontology generation at 26. In ontology generation, context vectors 52 and extraction patterns 54 are developed and applied to both the extracted terms 48 and to the processed customer service interactions at 44. Context vectors 52 and extraction patterns 54 will be described in further detail herein.

Context vectors are rules or algorithms that are applied to the extracted term 48 and the customer service interactions 44 in order to identify or group similar or related terms which can exemplarily be identified or grouped as synonyms, equivalents, or as classes in the ontology. Context vectors can also be applied in order to disambiguate a term meaning according to the local context in which the term is used in the customer service interaction. Context vectors may be created as part of a pre-processing stage, exemplarily, during the corpus processing 22 or used in the ontology generator 26. As inputs, the context vectors receive statics of the extracted terms in the customer service interaction and receive the identified meaning units from the customer service interactions.

In the extraction of patterns at 54, a pattern can be defined as a syntactic pattern within a sentence or meaning unit boundary. The pattern may be expressed as a regular expression, generalizing common syntactic structure found within sentences or meaning units of the customer service interactions. The syntactic patterns may generally identify relations between identified classes of terms as the terms appear in relation to one another, and to common intervening phrases, scripts, or micropatterns. A non-limiting example of a pattern may be searching for the following sentence or meaning unit within a customer service interaction:

"[Customer] would like to [action] the [object] . . . ". If such a pattern is identified in an utterance, sentence, or meaning unit of a customer service interaction, then the terms that actually occur in the meaning unit can be identified as belonging to or being related to the identified classes in the pattern.

The identified terms, classes, and term-class relations are stored at 56 as ontologies to be used in the automated interpretation of customer service interactions. As noted with scripts above, the process of ontology maintenance 58 may exemplarily include the presentation of the developed ontologies to a user 60 for manual user review, input, modification or other analysis in an effort to refine, or maintain the automatedly generated ontologies at 56.

Figure 3:
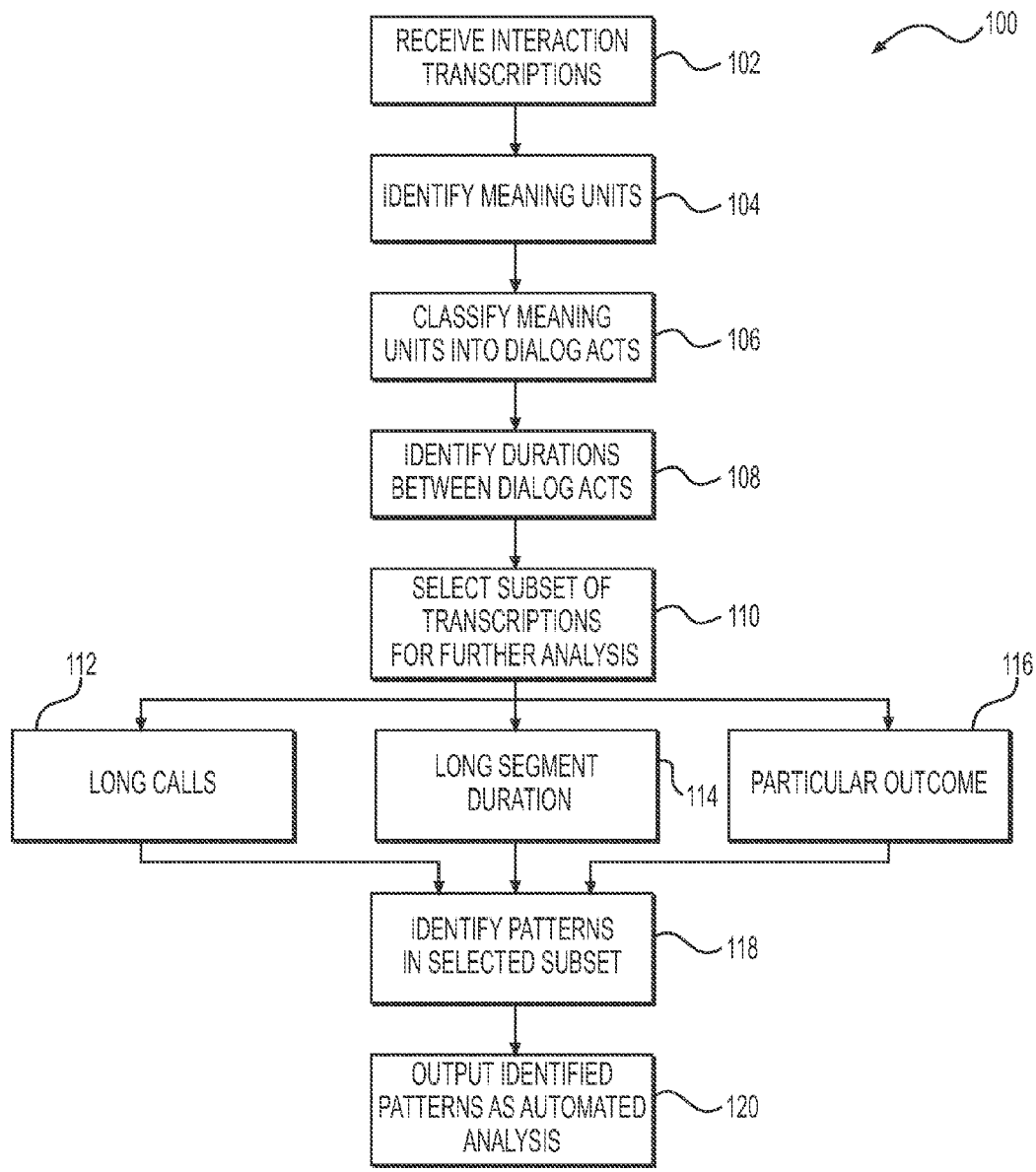
FIG. 3 is a flowchart of an exemplary embodiment of a method of discourse analysis.
Figure 4:
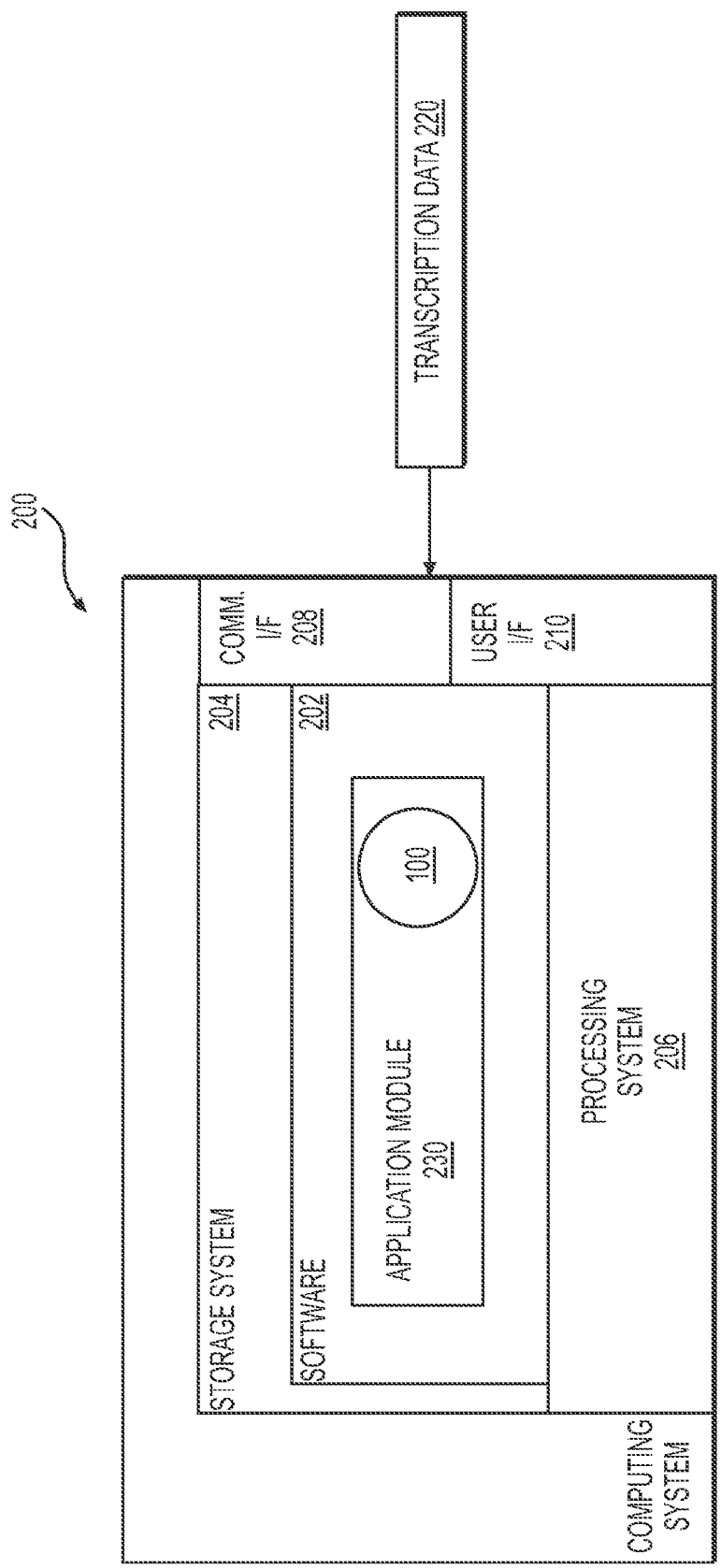
FIG. 4 is a system diagram of an exemplary embodiment of a system for discourse analysis.

FIG. 3 is a flow chart of an exemplary embodiment of a method 100 of discourse analysis. In the method 100, a plurality of interaction transcriptions are received at 102. It will be recognized that in embodiments, the interaction transcription may be readily available, while in other embodiments, a recorded audio file or a streaming audio file must first be transcribed for use herein.

Next, at 104 meaning units are identified within the interaction transcript. As described above, the meaning units can be identified by first identifying utterances within the transcript and then identifying meaning units within the utterances.

In an exemplary embodiment, meaning units may be classified into four categories of dialog acts, exemplarily information, requests, responses, and social. In an additional embodiment, a fifth dialog act, repetition, may be used to identify a repetition of a immediately previous dialog act, particularly, when one party to an interaction repeats the meaning unit previously spoken by the other party to the interaction.

Figure 5:
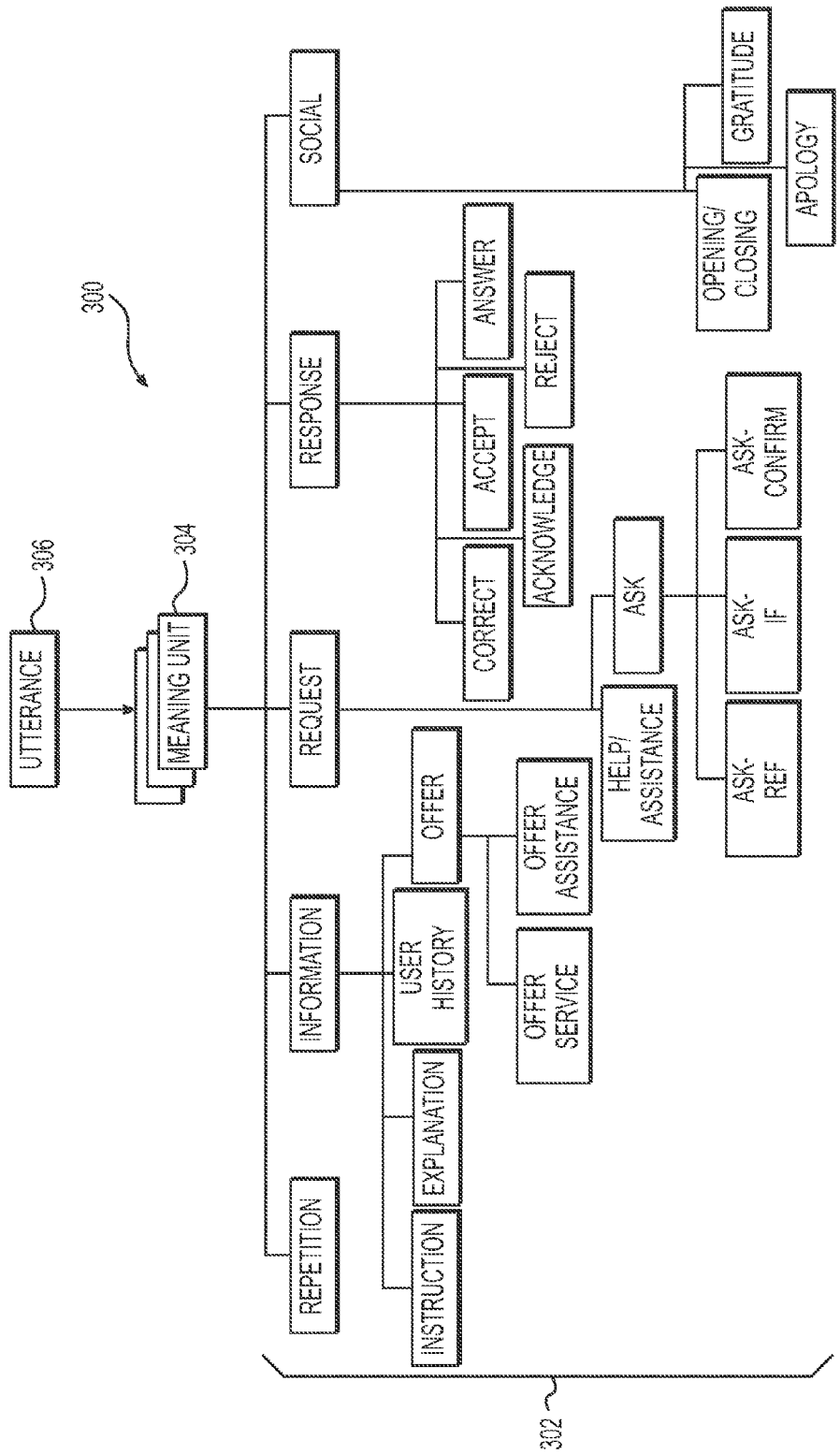
FIG. 5 depicts an exemplary embodiment of a hierarchy of dialog acts.

FIG. 5 depicts and exemplary embodiment of a hierarchy 300 of dialog acts 302 which each of a plurality of meaning units 304 can be classified. As stated above, the plurality of meaning units 304 are identified within one or more utterances 306.

The table below gives examples of meaning units and their associated dialog acts.

| Dialog act | Example |
| --- | --- |
| Social | (1) GOOD AFTERNOON YOURE SPEAKING WITH OWEN |
|  | (2) YEAH ILL PUT YOU ON HOLD AND ILL FIND OUT FOR YOU |
| Request | (1) YEAH MM DID YOU RECEIVE ANY FORMS THAT YOU HAD TO FILL OUT |
|  | (2) AND UM I NEED TO CHANGE THE CREDIT CARD NUMBER AND ALSO CHANGE THE NAME ON THE ACCOUNT |
| Response | (1) YEP ITS THE SAME ITS THE SAME CARD LINKED TO THE SAME THING |
|  | (2) YEP |
| Information | (1) HI MARGARET I JUST GOT MY MOBILE ACCOUNT WHICH IVE BEEN USING FOR ONLY CDMA MINI MAX INTERNET NETWORK |
|  | (2) BASICALLY WHAT WE NEED TO DO IS TO MAKE SURE THAT YOURE NOT GOING IN FOR A CONDITION THAT YOU HAD PRIOR TO REJOINING WITH US |

A detailed example of an embodiment of the classification of meaning units into dialog acts is provided herein. In such embodiment, a training table of bigrams and associated dialog act may be used to initially train a classifier. Other training features for each meaning unit may include; bigrams including <s> and </s> to indicate beginning and end of the meaning unit, speaker, length of meaning units, (e.g. shorter or longer average), a dialog act of a previous meaning unit, and/or a dialog act of a next meaning unit. The dialog act classifier may exemplarily be built using WEKA or Naïve Bayer. It is possible to use feature selection in embodiments with many features (e.g. bigrams).

In an embodiment, the classifier may be built and trained without previous and next dialog acts. A training file is prepared (ARFF format for WEKA). In this file, each row contains data about one meaning unit (e.g. a list of existing bigrams, speaker, length and the dialog act for this meaning unit). Using Naïve bayes a classifier is built from the training file. A test file is prepared (ARFF format for WEKA). In this file, each row contains data about one meaning unit (a list of existing bigrams, speaker and length). Using the classifier, a dialog act for each meaning unit is predicted. Dialog acts with high probability are updated in the database and may be used in the subsequent steps.

Using the Classifier, a dialog act for each meaning unit is predicted. Dialog acts with high probability are updated in the database and will be used in the next step. An iterative process is used to assign dialog acts with high probabilities only by repeating the preparation of the test file and prediction of each meaning unit. In the end of all iterations, if a meaning unit is not associated it a dialog act with a high probability, the dialog act will remain 'unknown'.

The table below gives examples of meaning units and automatically classified dialog acts.

| Meaning unit | Dialog act |
| --- | --- |
| my name is <unk> how may i help hi i'm calling because i was being charged where repair service | social |
| and i have a whole calling for any repairs | Request |
| okay i apologize ma'am | Response |
| they're having problems with your bill | Unknown |
| be more than happy to help you can i have the home telephone number | Request |
| seven one three seven eight four two two three nine yes | Unknown |
| okay and whom am i speaking with | Unknown |
| alright laura merrill okay | Response |
| and for verification purposes can you verify your account number | Unknown |
| that would be the number directly following your telephone number on your phone bill | information |
| nine nine five okay | Response |
| and then let me just read a quick privacy statement | Information |
| to you and during this call i would like to use your service and usage records to discuss products offered by the at&t family of companies protecting the privacy of this information is your right and our duty under federal law | Information |
| and your decision will not affect your service is that okay yes okay where | information |
| do you see the charges for the repair | Request |
| okay hold on the first page | Response |

Figure 6:
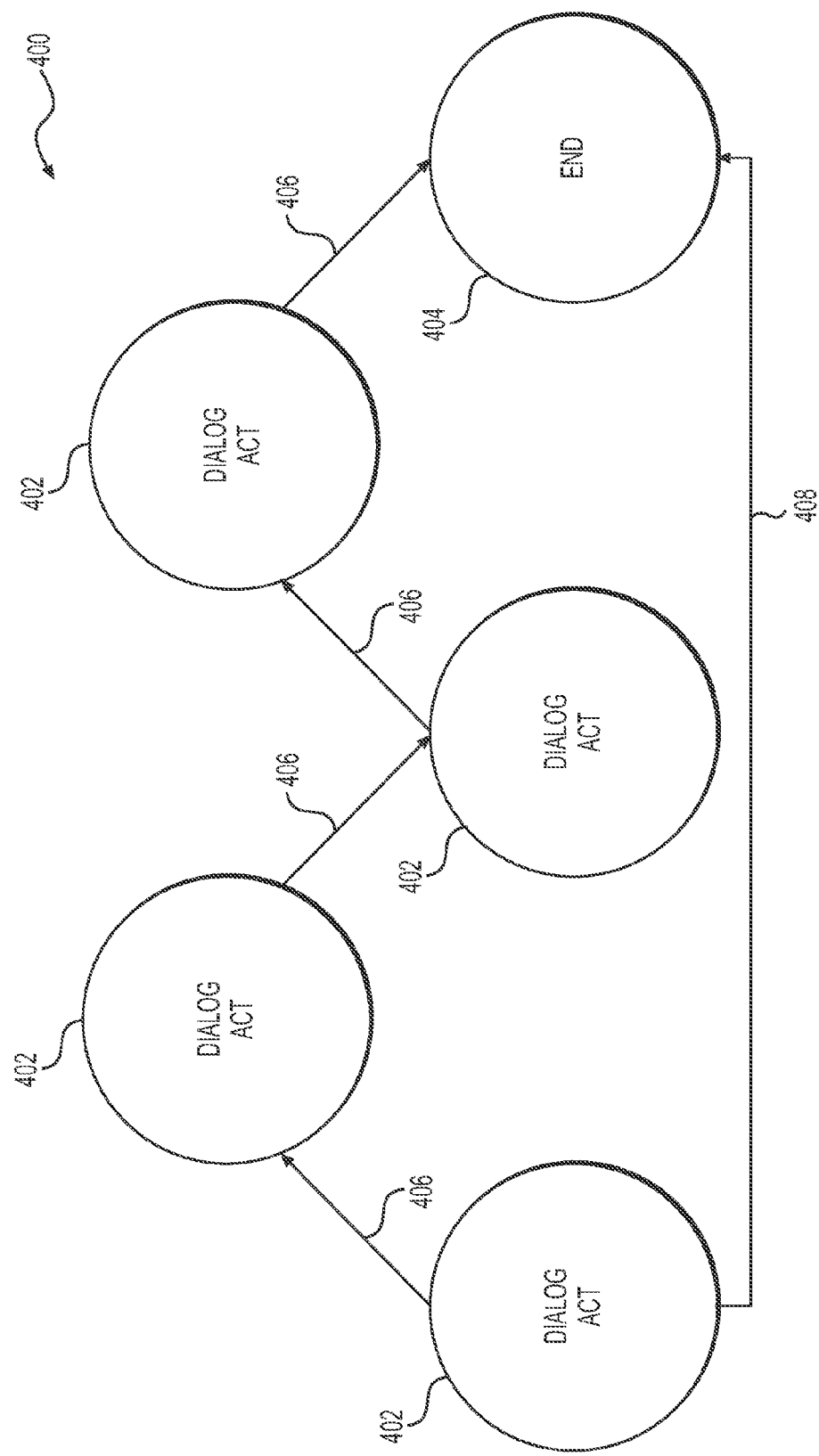
FIG. 6 is an exemplary embodiment of a map of an interaction flow.

Referring back to FIG. 3, at 108 duration between dialog acts are identified. An exemplary embodiment of this is depicted in FIG. 6, which is an exemplary embodiment of a map of an interaction flow 400. The interaction flow 400 progresses as a series of dialog acts 402 before the interaction comes to an end 404. Between each identified dialog acts is a duration 406 of the previously identified dialog act 402. Not only do the durations identified at 108 provide a length of each dialog act, but when summed, provide a length of the entire interaction 408. From this entire interaction length, comparative analysis between particular dialog acts and the overall interaction length 408 can be made and analyzed as disclosed herein.

Referring back to FIG. 3, at 110 a subset of the transcriptions are selected for further analysis. While this selection may be made based on a variety of criteria, as will be exemplarily described herein, the subset of transcriptions may be selected at 110 in order to select exemplarily long calls at 112, long segment durations at 114, or transcriptions with particular outcomes at 116. Each of these subsets of transcriptions are related to analysis that may be made with discourse analysis.

Exemplarily, by selecting a subset of long calls 112, those customer service interactions that exceed a particular duration are selected for further analysis in order to identify the cause or causes for excessively long calls. By investigating transcriptions that include a particularly long segment duration, further investigation may be made into the features or events that result in particularly long dialog acts. Finally, a subset of transcriptions selected at 116 for those transcriptions that result in a particular outcome, exemplarily, but not limited to sales or cancellations. By investigating the dialog act and the patterns of the call flows that result in a particular outcome, further insight into the customer service interactions will be identified.

Independent from the subset of transcriptions that are selected at 110, at 118 patterns in the selected subsets are identified. In an exemplary embodiment, one such pattern may be particular agent or group of customer service agents are represented in the selected subset of long calls or segments with long durations. The identified agent or agents may then receive additional training or guidance in order to improve upon these abnormally long durations. Alternatively, patterns identified in a selected subset of transcriptions from long calls may identify a reason or reasons for the call length and further may identify which particular topics, events, or dialog acts are most likely to result in abnormally long calls. In still further examples, patterns that may be identified in the selected subset of transcriptions resulting in a particular outcome may include an identification of how a call results in an upsell start, or what is the call flow of a call that results in a cancellation.

Finally at 102, many patterns identified at 118 are output at automated analysis. The output at 120 may exemplarily be a visual presentation on a graphical display. In embodiments, the output may be sent to one or more recipients in a variety of completion forms, exemplarily text message or email.

FIG. 2 is a system diagram of an exemplary embodiment of a system 200 for discourse analysis. The system 200 is generally a computing system that includes a processing system 206, storage system 204, software 202, communication interface 208 and a user interface 210. The processing system 206 loads and executes software 202 from the storage system 204, including a software module 230. When executed by the computing system 200, software module 230 directs the processing system 206 to operate as described in herein in further detail in accordance with the method 100.

Although the computing system 200 as depicted in FIG. 2 includes one software module in the present example, it should be understood that one or more modules could provide the same operation. Similarly, while description as provided herein refers to a computing system 200 and a processing system 206, it is to be recognized that implementations of such systems can be performed using one or more processors, which may be communicatively connected, and such implementations are considered to be within the scope of the description.

The processing system 206 can include a microprocessor and other circuitry that retrieves and executes software 202 from storage system 204. Processing system 206 can be implemented within a single processing device but can also be distributed across multiple processing devices or subsystems that cooperate in existing program instructions. Examples of processing system 206 include general purpose central processing units, application specific processors, and logic devices, as well as any other type of processing device, combinations of processing devices, or variations thereof.

The storage system 204 can comprise any storage media readable by processing system 206, and capable of storing software 202. The storage system 204 can include volatile and non-volatile, removable and non-removable media implemented in any method or technology for storage of information, such as computer readable instructions, data structures, program modules, or other data. Storage system 204 can be implemented as a single storage device but may also be implemented across multiple storage devices or sub-systems. Storage system 204 can further include additional elements, such a controller capable, of communicating with the processing system 206.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to storage the desired information and that may be accessed by an instruction execution system, as well as any combination or variation thereof, or any other type of storage medium. In some implementations, the storage media can be a non-transitory storage media. In some implementations, at least a portion of the storage media may be transitory. It should be understood that in no case is the storage media a propagated signal.

User interface 210 can include a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a video display or graphical display can display an interface further associated with embodiments of the system and method as disclosed herein. Speakers, printers, haptic devices and other types of output devices may also be included in the user interface 210.

As described in further detail herein, the computing system 200 receives transcription data 220. The transcription data 220 may exemplarily be a text file and may exemplarily be a transcription of a conversation or interaction which may exemplarily be between two speakers, although the transcription may be of any of a variety of other interactions, including multiple speakers, a single speaker, or an automated or recorded message. In a further exemplary embodiment, the transcription data is of a customer service interaction between a customer and a customer service agent.

In still further embodiments, the transcription data 220 may be audio data that must be transcribed by the computing system. In such embodiments, the processing system 206 may be capable of performing a transcription of audio data, exemplarily by applying large vocabulary continuous speech recognition (LVCSR) speech-to-text algorithms. The audio data may exemplarily be a .WAV file, but may also be other types of audio files, exemplarily in a pulse code modulation (PCM) format and an example may include linear pulse code modulated (LPCM) audio file. Furthermore, the audio file may exemplary be a mono audio file; however, it is recognized that in embodiments the audio file may alternatively be a stereo audio file. In still further embodiments, the audio file may be streaming audio data received in real time or near-real time by the computing system 200.

Embodiments as disclosed herein may provide the benefits of automated analysis of driver of long calls. The discourse analysis enables the identification of the conversation, flow or sub flow within a call, and the duration of each of these dialog acts. This enables common dialogs acts to be benchmarked so that identifications can be made whether or not the instance of a dialog act is within an expected average. By mapping call flow as a series of dialog acts investigations can further be made into dialog acts that occur together, in a sequence, or within durations of each other. In an alternative embodiment, call flow can be mapped on the basis of identified themes within the transcript. In a non-limiting embodiment, a plurality of transcriptions may be analyzed to identify themes in each of the transcriptions that these things may then be grouped and organized by average position within the calls of the transcripts this producing an average theme position call map of expected themed flow.

Ontology

In the context of customer service interactions, communication content may exist as various forms of data, including but not limited to audio recording, streaming audio, transcribed textual transcripts, or documents containing written communications, such as email, physical mail, text messages, etc. While the present disclosure is exemplified herein by describing an embodiment involving the analysis of audio data, such as recorded audio transcripts, it is to be understood that in alternative embodiments of oral or written communications may be used or analyzed.

An ontology as disclosed is a formal representation of a set of concepts and the relationships between these concepts. In general, an ontology will focus on a specific domain or general context within which the individualized terms or classes as described herein are interpreted. As a non-limiting example, the ontologies described herein are with respect to customer service interactions. A particular ontology may be defined for a specific domain, such as financial services, consumer products, subscription services, or some other service interactions.

Figure 7:
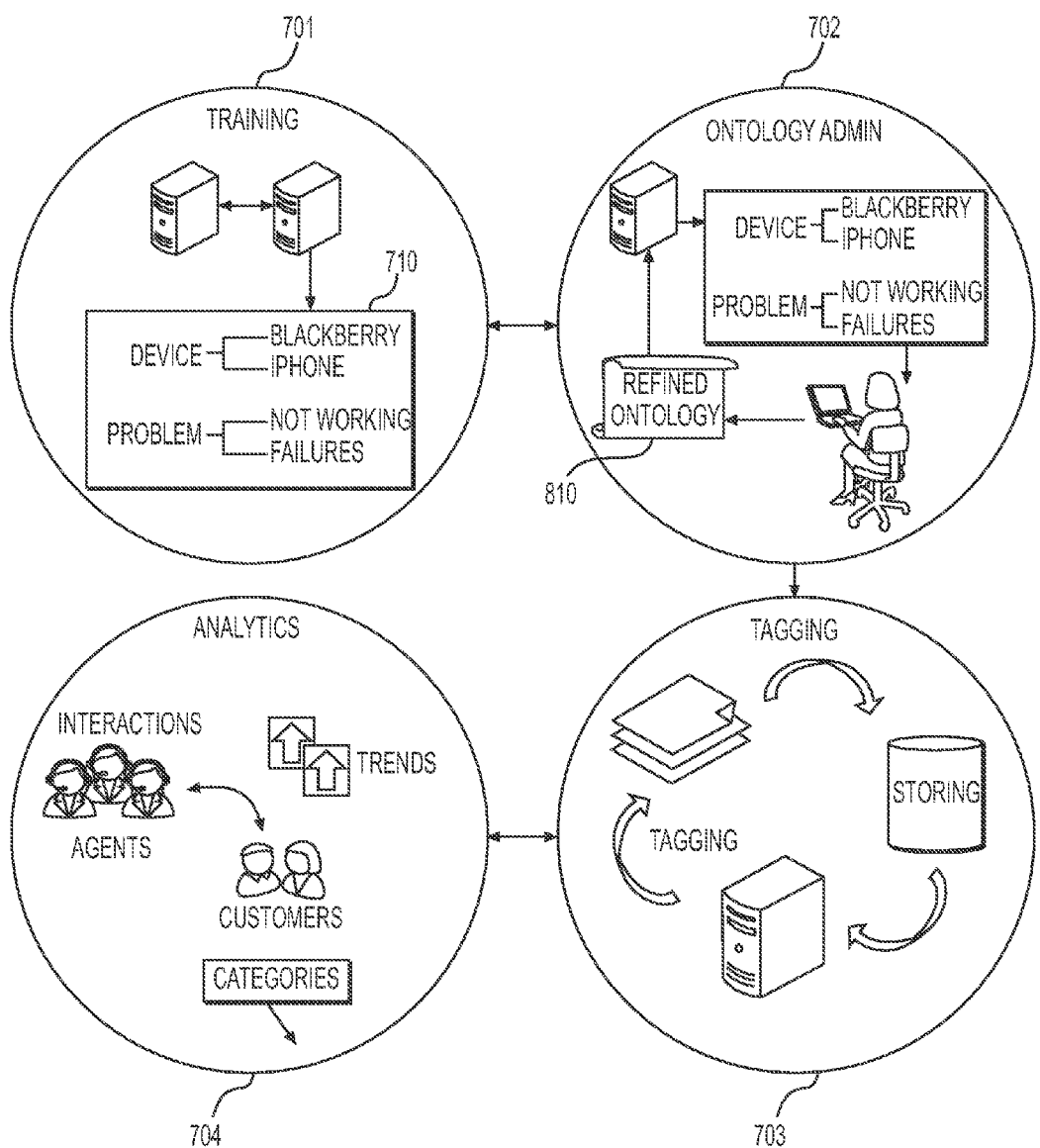
FIG. 7 depicts an exemplary embodiment of the ontology process and programming disclosed herein.

The presently disclosed ontology solution incorporates four main stages. As seen in FIG. 7, the four main stages include training 701, ontology administration 702, ontology tagging 703, and ontology analytics 704. The training step 701 involves machine learning in which the system learns the customer's specific domain and formulates an initial ontology 710. The initial ontology 710 is then passed to the ontology administration step 702 wherein the user reviews the initial ontology 710 and refines it to create a refined ontology 810. The refined ontology 810 is then stored and passed to the tagging module 703. Tagging is a continuous online process that uses the ontology to tag tracked items in incoming interactions, and stores the tagged interactions in a persistent repository. Finally, the tagged interactions are then used by the analytics module 704 to analyze and extract business data based on an enhanced formulation of a company's internal knowledge and terminology. A detailed analysis of each stage is addressed in turn.

In the training phase 701, communication data is transformed into a usable format and then analyzed. For example, audio data from a customer interaction between a customer service agent/IVR and a customer/caller can be automatically transcribed into a textual file through speech recognition techniques. However, challenges exist in automatically interpreting the content and sentiments conveyed in a human communication, such as a customer service interaction. An ontology, which generally refers to a collection of entities and their relations, is one way in which an automated interpretation of a customer service interaction can be developed, organized, and presented as disclosed herein.

Generally, an ontology as disclosed herein includes terms which are individual words or short phrases that represent the basic units or concepts that might come up in the customer service interaction. Non-limiting examples of terms, as used herein, include "device", "iPhone", "iPhone four", "invoice", "I", "she", "bill", "cancel", "upgrade", "activate", "broken", or "cell phone", "customer care", or "credit card." However, these are not intended to be limiting in any manner and are merely exemplary of basic units or concepts that may be found in a customer service interaction. All words in the corpus can only be associated with one term, and each term can only be counted once.

Classes are broader concepts that encapsulate or classify a set of terms. Classes describe semantic concepts to which classified terms are related. It is also to be understood that classes may also classify or encapsulate a set of subclasses in which the terms are classified. Non-limiting examples of classes, may be include "objects", "actions", "modifiers", "documents", "service", "customers", or "locations". However, these are not intended to be limiting on the types of classes, particularly the types of classes that may appear in an ontology directed to a specific or specialized domain.

The classes, subclasses, and terms are connected by a plurality of relations which are defined binary directed relationships between terms and classes/subclasses or subclasses to classes. In a non-limiting example, the term "pay" is defined under the class "action" and the term "bill" is defined in the class "documents". Still further binary directed relationships can be defined between these class/term pairs. The action/pay pair is related to the document/bill pair in that the payment action requires an underlying document, which may be a bill. In another non-limiting example, the term "broken" is defined in the class "problems" and the term "iPhone" is defined in the class "device". The problem/broken pair can also have a directed relationship to the "devices" class in which the "iPhone" term is a specific example as represented by the devices/iPhone pair.

Figure 14:
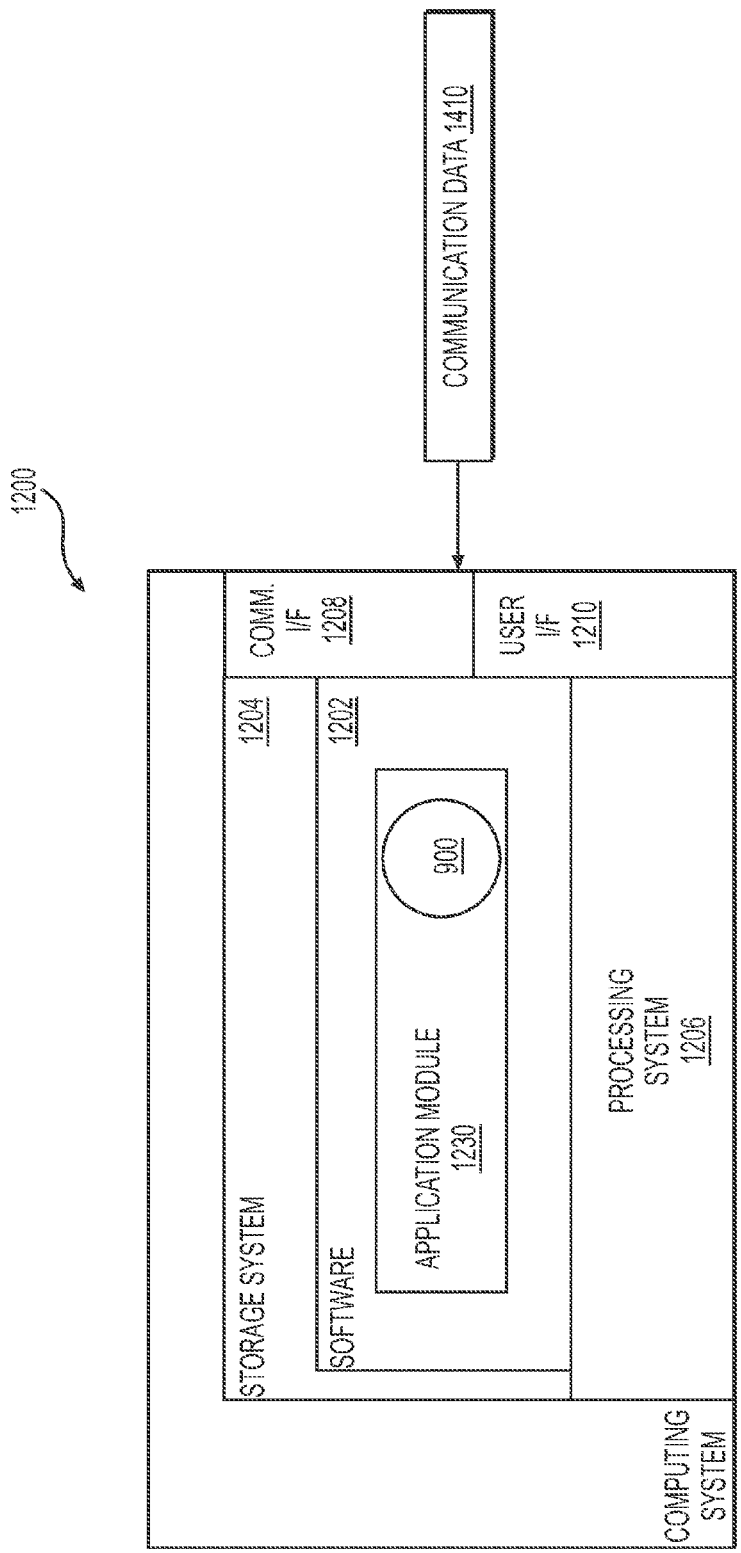
FIG. 14 is a system diagram of an exemplary embodiment of a system for automated language model adaptation implementing an ontology training module.

FIG. 14 is a system diagram of an exemplary embodiment of a system 1200 for automated language model adaptation implementing an ontology training module 900. The system 1200 is generally a computing system that includes a processing system 1206, storage system 1204, software 1202, communication interface 1208 and a user interface 1210. The processing system 1206 loads and executes software 1202 from the storage system 1204, including a software application module 1230. When executed by the computing system 1200, software module 1230 directs the processing system 1206 to operate as described in herein in further detail, including execution of the ontology training module 900.

Although the computing system 1200 as depicted in FIG. 14 includes one software module in the present example, it should be understood that one or more modules could provide the same operation. Similarly, while description as provided herein refers to a computing system 1200 and a processing system 1206, it is to be recognized that implementations of such systems can be performed using one or more processors, which may be communicatively connected, and such implementations are considered to be within the scope of the description.

The processing system 1206 can comprise a microprocessor and other circuitry that retrieves and executes software 1202 from storage system 1204. Processing system 1206 can be implemented within a single processing device but can also be distributed across multiple processing devices or sub-systems that cooperate in existing program instructions. Examples of processing system 1206 include general purpose central processing units, applications specific processors, and logic devices, as well as any other type of processing device, combinations of processing devices, or variations thereof.

The storage system 1204 can comprise any storage media readable by processing system 1206, and capable of storing software 1202. The storage system 1204 can include volatile and non-volatile, removable and non-removable media implemented in any method or technology for storage of information, such as computer readable instructions, data structures, program modules, or other data. Storage system 1204 can be implemented as a single storage device but may also be implemented across multiple storage devices or sub-systems. Storage system 1204 can further include additional elements, such a controller capable, of communicating with the processing system 1206.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to storage the desired information and that may be accessed by an instruction execution system, as well as any combination or variation thereof, or any other type of storage medium. In some implementations, the store media can be a non-transitory storage media. In some implementations, at least a portion of the storage media may be transitory. It should be understood that in no case is the storage media a propagated signal.

User interface 1210 can include a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a video display or graphical display can display an interface further associated with embodiments of the system and method as disclosed herein. Speakers, printers, haptic devices and other types of output devices may also be included in the user interface 1210.

As described in further detail herein, the computing system 1200 receives communication data 1410. The communication data 1410 may be, for example, an audio recording or a conversation, which may exemplarily be between two speakers, although the audio recording may be any of a variety of other audio records, including multiple speakers, a single speaker, or an automated or recorded auditory message. The audio file may exemplarily be a .WAV file, but may also be other types of audio files, exemplarily in a pulse code modulated (PCM) format and an example may include linear pulse code modulated (LPCM) audio data. Furthermore, the audio data is exemplarily mono audio data; however, it is recognized that embodiments of the method as disclosed herein may also be used with stereo audio data. In still further embodiments, the communication data 10 may be streaming audio data received in real time or near-real time by the computing system 1200.

Figure 8:
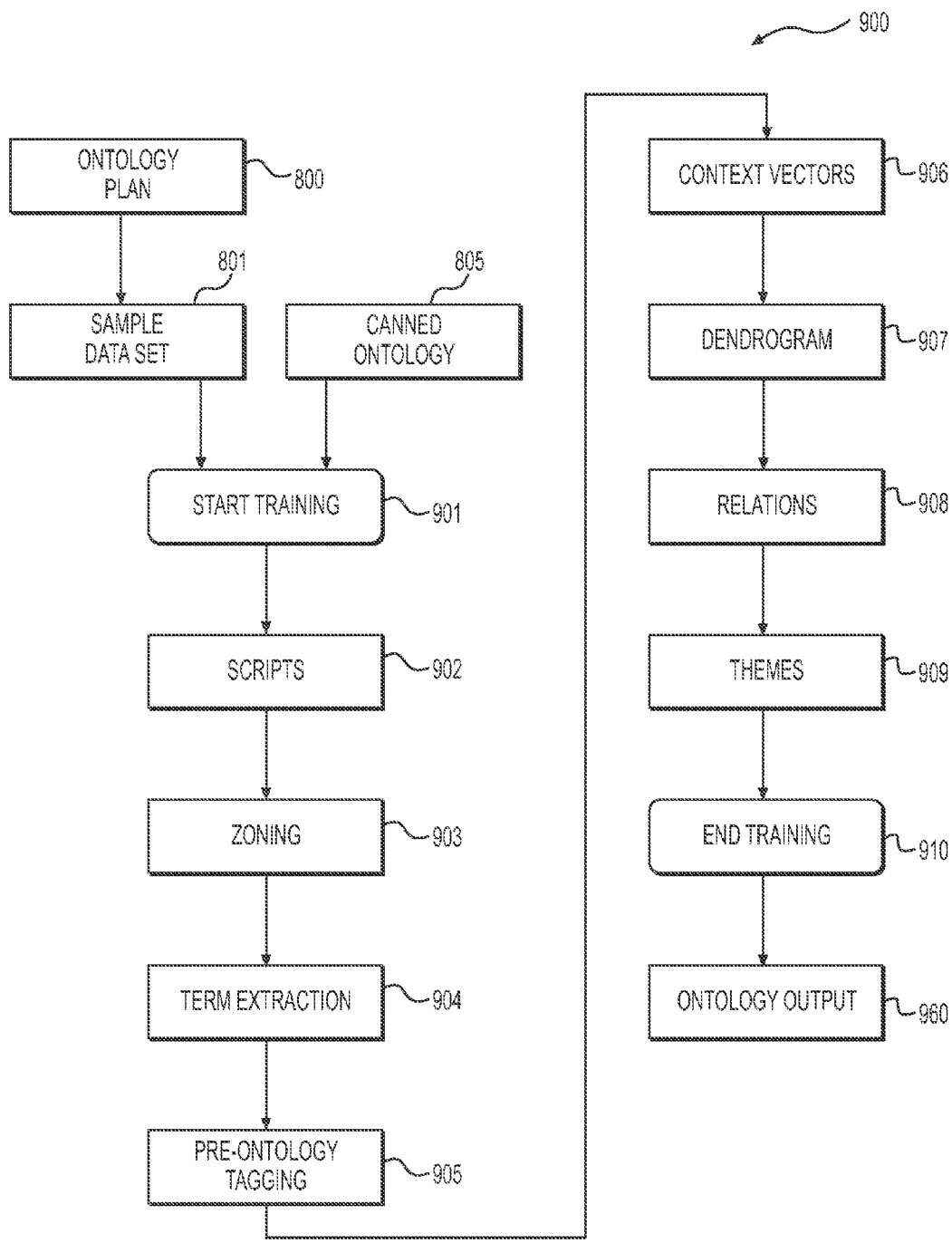
FIG. 8 is a schematic diagram of an embodiment of a process for ontology development.

FIG. 8 represents an overview of an exemplary training phase 701 for developing an initial ontology 710. The initial ontology 710 is built by a step-by-step pipeline process that applies various features to the defined data. These features include the extracting and surfacing of words and phrases in the corpus that helps users make non-trivial observations about a customer-specific domain.

As exemplified in FIG. 8, developing an ontology may begin with the prerequisite steps of developing an ontology plan 800 and sample data set 801. Developing an ontology plan 800 involves assessing a customer's business needs to develop a comprehensive plan for the ontological structure that can process the customer's data to provide the desired result. For example, developing an ontology plan 800 could involve determining how many ontologies are required for a specific customer. For example, customers may decide they need multiple ontologies to handle specialized types of data that can be categorized into different business domains.

Developing the sample data set 801 involves accumulating a good and varied range of data for each planned ontology. The data required for this purpose preferably originates from different time periods, for example, within about a month previous to the date of implementing the training step. The data is validated and gathered from different types of defined sources. Preferably, the ontology training process 701 is not executed until a certain, predefined amount of data is gathered for the training. For example, a configured scheduler may monitor the data gathering process and count the number of records or amount of data added. When the number of records or amount of data in the sample data set 801 reaches that predetermined amount, the scheduler may execute the ontology training process 701.

Once the sample data set 801 is fully developed, the training may begin. At step 901, the sampled data set 801 for each planned ontology 800 is fed into the training module 900. The module 900 then identifies scripts 902 within the sample data set 801. Scripts are lengthy, repeated patterns that appear in the data set 801. For example, a standard phrase spoken by a customer service agent, such as "Hello, how can I help you?" may comprise a script. Next, the module 900 executes a zoning process 903 that segments conversations within a defined corpus, or data set, into meaning units. Meaning units 68 are sequences of words that express an idea, such as may be the equivalent of sentences. An example of a meaning unit in a customer service context would be the customer statement "I would like to buy a phone."

After the zoning process has been completed for the sample data set 801, the module 900 executes term extraction 904. Term extraction 904 is a process that reviews all meaning units and extracts the terms that are meaningful in a corpus. A term is a short list of words (e.g. between 1 and 5 words) that has a precise meaning, or a meaning that stands out in its context. For example, "credit card" and "your account number" could both be appropriate terms. Next, the module 900 executes a pre-ontology step 905 that tags all overlapping terms in a non-overlapping way. Longer terms are generally preferred over shorter ones. For example, the term "my phone number" is counted as one term, rather than two—i.e. "my phone" and "number."

Following the pre-ontology process step 905, the module 900 processes the sample data set 801 to identify context vectors 906. Context vectors 906 are linkages between defined terms in the corpus, or data set, and the words that appear before or after each term. For example, the term "account" could be preceded by any of several terms, such as "have an," "to your," "a prepaid," "cancel my," or "my husband's." Likewise, the term "account" could be followed by any number of terms, such as "holder's", "receivable", or "been canceled." These so called left and right context vectors contain the predictive words for a main term, also referred to as a pivot term.

Identifying context vectors 906 forms the basis for the next step, building dendrograms 907, which is building a hierarchical clustering of terms. The training system uses the premise that terms that share contextual similarity and have similar linguistic characteristics also share the same general meaning. In other words, terms with similar context vectors may be synonyms (e.g., purchase/buy), conceptually interchangeable (e.g., days, dates, locations), ontologically similar (e.g., financial transactions). Terms that share these characteristics are good candidates to be inserted in the ontology as a group of terms with similar meanings. In order to accomplish that, the system scans the context vectors of all terms created in the previous phase and clusters together terms with similar context vectors. A dendrogram, for example, may center around the term "purchase." The left context vector (preceding term) may be "want to", "need to", etc. While the right context vector (following term) may be "an i-phone", "the service", "high-speed internet." Initially, all detected terms in the corpus are located with similar terms in clusters on the dendrogram. Then, the dendrogram is transformed into a contextual similarity tree that only contains the stronger similarity clusters of the original dendrogram based on a similarity score algorithm that scores the similarity of the terms in the associated context vectors. During this transformation process, some terms are eliminated and some are grouped or merged with other meaningful terms. Preferably, the minimum number of terms in a dendogram cluster is four, in order to provide a meaningful analysis of the grouped terms. By way of example, the following terms "purchase" and "buy" have similar context vectors:

| Term: Purchase | Left Context Vector (Before Term): | Want To, Need To, Have To |
| --- | --- | --- |
| | Right Context Vector (After Term): | An i-Phone, The Service, High-Speed Internet |
| Term: Buy | Left Context Vector (Before Term): | Want To, Need To, Must |
| | Right Context Vector (After Term): | i-Phone, High-Speed Internet, A Service That |

These two terms would be combined into one dendrogram cluster. The ontological premise is that there is a contextual similarity between these terms and therefore, they are clustered together. A set of dendrogram clusters can be presented as a hierarchical structure, such as a tree structure, where terms and clusters that are related are placed near one another in the structure.

After the dendrogram 907 development, relations 908 are developed within the sample data set 801. Relations 908 are linkages or relationships between the defined terms in the corpus. For example, "cancel>account," "speak with>supervisor," and "buy>new iPhone" are exemplary relations 908. The system defines a concise number of strong, meaningful relations according to certain pre-defined policies or rules. Those strong relations are given a higher score, and thus are given preference over other, lower-scoring relations.

Then, based upon the established relations 908, the system identifies, or surfaces, themes 909 appearing within the dataset. Themes 909 are groups or categories of relations that are similar in meaning. A theme 909 represents a concept and is defined by its associated relations. A theme encapsulates the same concept among several interactions. Themes 909 allow users to easily and efficiently understand the characteristics of interactions throughout the corpus. For example, the theme "got an email" might correspond to several relations, including "got the email," "got confirmation," "received an email," "received an email confirmation," etc. In a call center data set, for example, one theme may represent a concept expressed in several different calls. In that way, a theme can provide a summary, or a compressed view, of the characteristics of the interactions in a communications data set. Preferably, a relation is assigned to only a single theme. Additionally, preferably only relations are tagged in the tagging phase 3 of a corpus. Themes are used in the analytics phase 4, and act as building blocks employed by analytics applications or modules.

Specifically, in one embodiment, themes can be identified using the following algorithm, or method. First, the term pairs, or relations, in a corpus are scored according to the following algorithm:

$$\text{score}(term1, term2) = \frac{\text{joint\_count}(term1, term2) \times \text{length\_in\_letters}([terms1\ terms2])}{\text{average\_distance}(term1, term2) + 1}$$

In the above algorithm, "joint count" represents the number of times the terms appear together in the specified order in the dataset (or a designated subset of the dataset), the "length in letters" represents the length of the words (letters or characters), taken together, in the term set (or relation). Those numbers are multiplied together and divided by the "average distance" between the terms plus 1. The average distance may be calculated as the average number of words that appear between the two terms. Alternatively, the average distance could be calculated as the average number of letters or characters between the two terms. Strong, or high scoring, term sets are those that are long (have many letters) with high appearance count and that appear close together. Low scoring term sets are short, appear infrequently, and are far apart in the data set (indicating loose context). High scoring term pairs, or relations, are valued over low scoring pairs.

After the relations, or term pairs, are scored, the relations are listed in descending order based on that score. That list of scored relations is then truncated so that only a certain number of top scoring relations are maintained. For example, the list may be truncated to retain a pre-defined constant number of relations. Alternatively, a predefined percentage of the relations may be kept. Before or after the list is truncated, the scores for each of the relations in the list may be normalized by assigning them a new score according to their rank in the list. Preferably the score is normalized in descending order, with the best pair (highest scoring term pair) receiving the highest normalized score and the worst pair (lowest scoring term pair) receiving the lowest normalized score.

Figure 9:
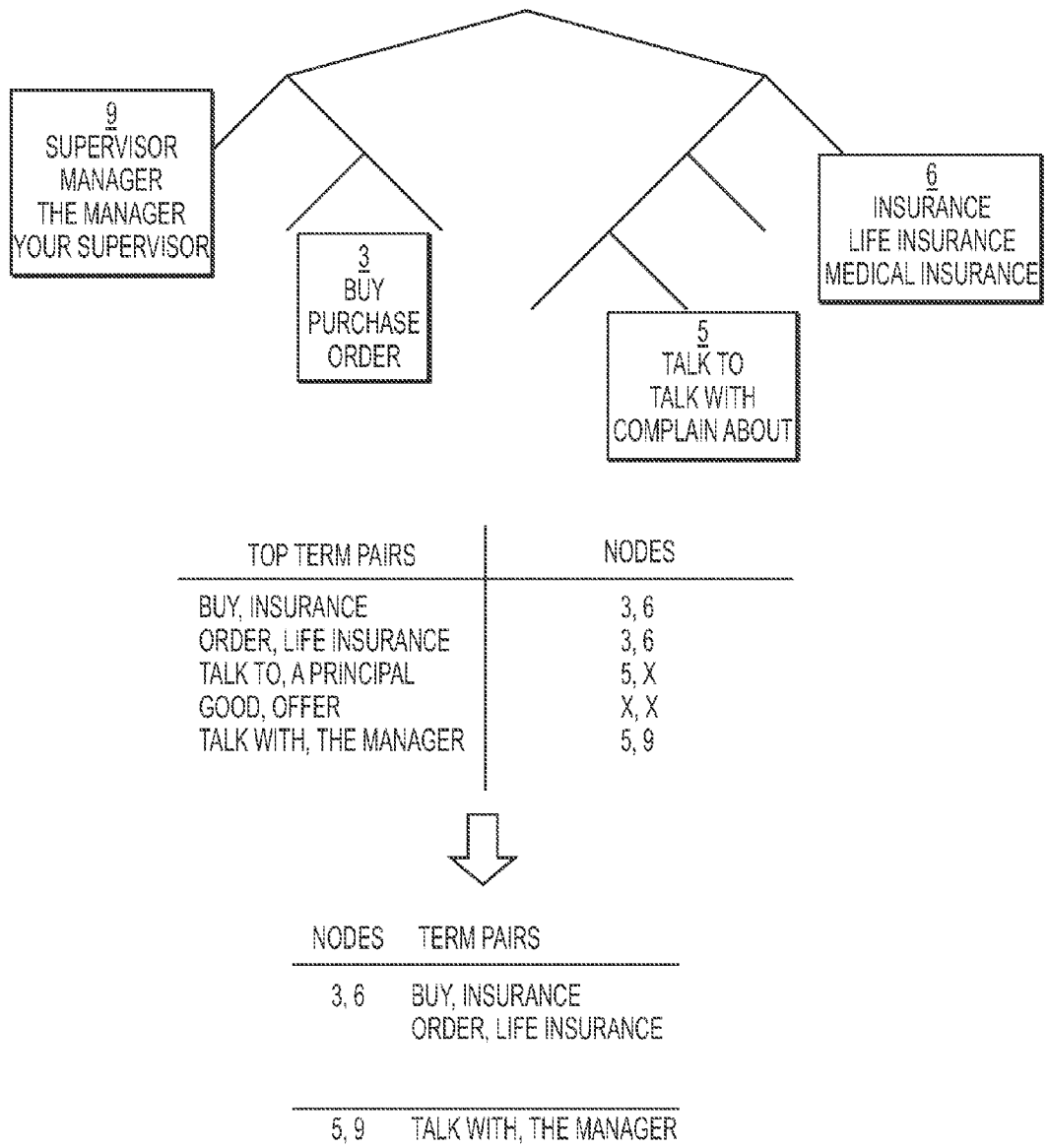
FIG. 9 depicts an exemplary embodiment of a dendrogram.

Then, for each term of each relation in the list, the corresponding dendrogram cluster, or parent node, if it exists, is identified. If found, the term pair is assigned to the identified dendrogram nodes pair, and a list of nodes is developed. Relations, or terms pairs, belonging to the same nodes pair can be grouped together. For example, as seen in FIG. 9, each dendrogram cluster receives a node number. Each term pair is then correlated with its corresponding node, or dendrogram cluster, pair. For instance, in FIG. 9 the term pair buy>insurance and order>life insurance both correlate to the node pair 3>6. Accordingly, those term pairs could be grouped together and identified according to their node pair.

As is also illustrated in FIG. 9, some terms may not correspond to any dendrogram cluster and thus may not have a corresponding node number. For example, in FIG. 9 the term pair talk to>a principal, the term "a principal" was not identified as being associated with any dendrogram cluster and thus did not receive a node number. In those instances node numbers may still be identifiable, or associatable, if the unassociated or un-grouped terms can be affiliated with node pairs or dendrogram clusters having textually similar terms. Such affiliation can be assessed by using character trigram similarity, which compares the literal similarity between the words in two separate relations or terms. Character trigram similarity assesses the similarity of words by assessing the words in the terms together, and specifically by comparing the letters of each of the words in each of the relations with one another. One way to do that is by parsing the relations or terms into letter triplets and determining whether those letter triplets appear in each relation or term. The character trigram similarity of two terms can be assessed according to the following algorithm:

$$\text{similarity}(a, b) = \frac{\sum_{trigram t \in a,b} \min(\text{count of } t \text{ in } a, \text{count of } t \text{ in } b)}{\text{number of trigrams belonging to } a + \text{number of trigrams belonging to } b}$$

In this way, the letter strings in each term are compared and their similarity is determined. Terms that have sufficiently similar letter strings in them are grouped together, for example in the same dendrogram cluster, or node. Thereby, previously unassociated terms can be placed into a group.

Preferably, the themes are expanded to incorporate as many of the identified terms and relations as possible. Since data sets may commonly be derived from speech-to-text translation algorithms, and because those algorithms are imperfect and often make slight mistranscriptions, it is desirable to use algorithms that can associate textually similar terms together—e.g., managers and manager, Sunday and Monday. Thus, as described above, unassociated relations can be assimilated into the established node groupings by comparing them with the already-grouped relations, for example using character trigram similarity. For relations that remain unassociated after such a comparison with the already-grouped relations, additional associations can be made by comparing the unassociated relations with one another. For example, the character trigram similarity algorithm can be used to compare and group the unassociated relations with one another. In some embodiments, the threshold for clustering or grouping these previously unassociated relations may be higher than the threshold for grouping the unassociated relations with the already-grouped relations. After all comparisons are completed, relations whose terms do not have any similarity linkages to other terms and thus cannot be clustered with other relations, are discarded as unimportant Once all of the terms are placed into node number pairs or are discarded as unimportant, the remaining list of node number pairs indicates groups of term pairs. This list could appropriately be termed a list of "theme candidates" because it contains groups of relations that could potentially be identified as themes. The list of theme candidates can be paired down using any number of techniques. For example, the theme candidates can be scored by averaging the scores (or normalized scores) of its original term pair members. Alternatively or additionally, the list of theme candidates can be compared to a pre-created, or "canned", list of important terms or themes. The "canned" list can be one that is created based on similar datasets, for example based on datasets belonging to another user in the same or similar industry. The theme candidates that appear on the "canned" list of important themes or terms could then be elevated as important, or high scoring, themes. Likewise, the list of theme candidates could be compared to a "canned" list of unimportant terms. The theme candidates that appear on the list can be removed, and purged because they are insignificant and do not add anything to the analysis. Additionally, the theme candidates could be scored based on their number of members, with the candidates having the most members receiving the highest score. The theme candidates can also be scored according to their entity consensus, where themes having terms that belong to the same entity or groups of entities are scored higher than those with terms belonging to disparate entities. Another scoring means is by diversity, where themes with a greater number of unique terms on either side of the relations receive a higher score. Further, the list of theme candidates can also be refined by a user, for example, at the ontology administration stage 2. In one embodiment, the theme candidates are scored according to a number of different metrics, such as those listed above, and then the scores are added together or averaged to calculate a final score. The theme candidates with the highest final scores can then be classified or identified as themes and used as a foundation for the analytics structure.

Figure 10:
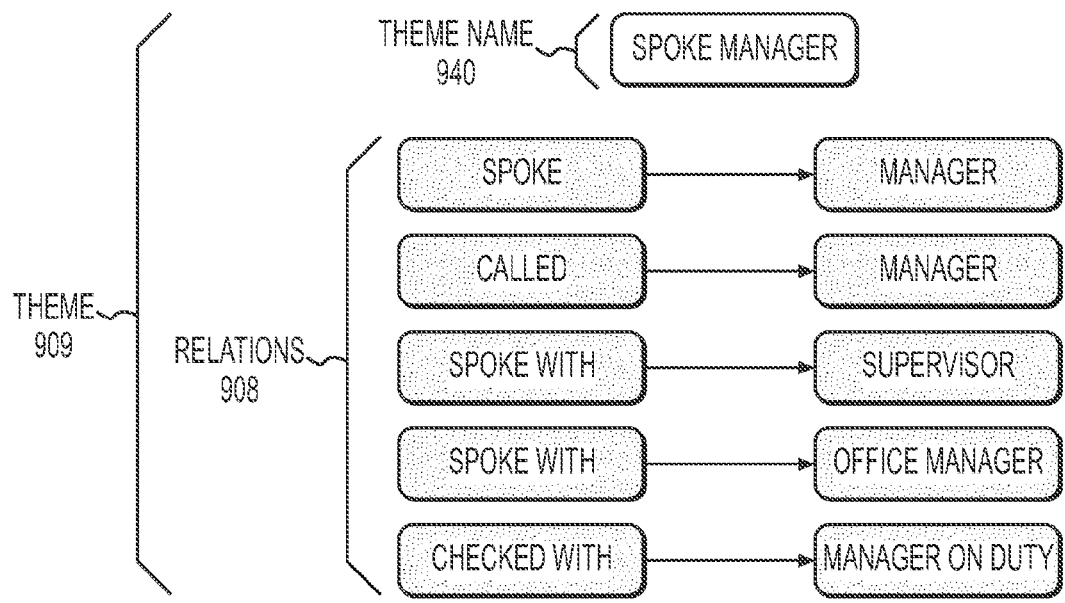
FIG. 10 is an exemplary display conveying information about themes in a dataset.

Themes can be displayed by displaying all of the relations comprising that theme and providing statistics about the appearance of such relations and/or the terms therein. In order to display a theme, or to create useful user interfaces displaying and conveying information about themes and about a group of themes in a dataset, each theme should be given a unique identifier, or theme name. For example, as seen in FIG. 10, information about themes 909 and relations 908 in a communication data set can be displayed by displaying the terms therein and connecting them with lines. Exemplary FIG. 10 demonstrates a display showing the theme name 940, data about the theme in the corpus, and the relations that comprise the theme.

Figure 11:
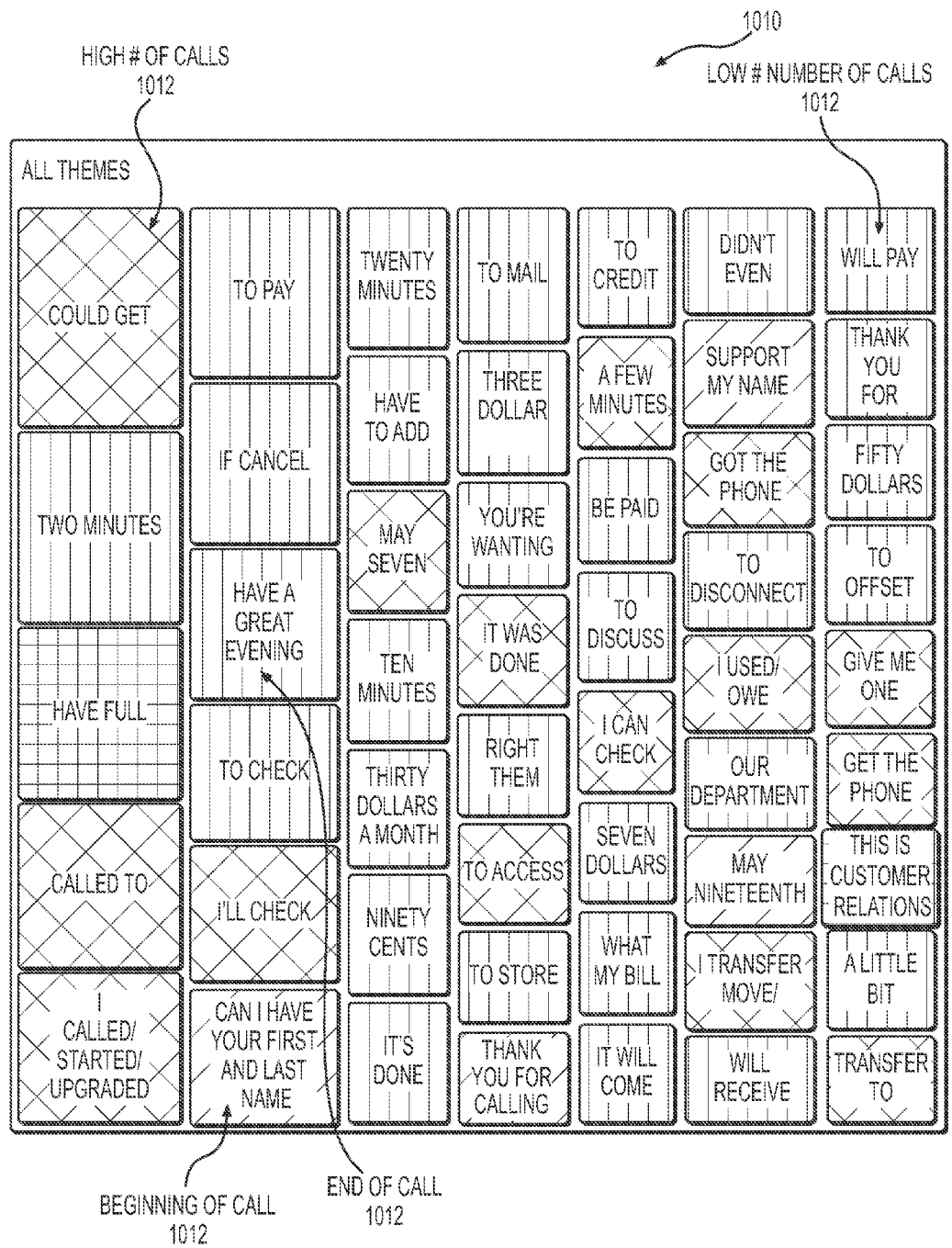
FIG. 11 is another exemplary display conveying information about themes in a dataset.

The theme name 940 is an identifier for the theme 909 that may be used, for example, in user interfaces as a shortcut for conveying information about the theme 909 using only a short string of words and/or characters. For example, as seen in FIG. 11, the theme names 940 can be used in a Tree Map 1010, which indicates key data about a large number of themes at one glance. The theme name 940 can be established by any number of methods. For example, the theme name 940 can be created based on the top relation or relations in the dataset, or a particular subset of the dataset being analyzed. Determination of the top relations may be based on any number of factors, or a combination thereof. For example, the top relations may be those receiving the highest term pair score (described above). Alternately, the top relations may be the most common relations from that theme appearing in the dataset. In still other embodiments, the top relations may be those with the highest normalized scores, or the highest final scores (described above).

Turning to back to FIG. 10, the theme name 940 is devised by concatenating the terms of the first relation—"spoke" and "manager". In another embodiment, the name 940 may be created from, for example, the top 3 relations. In FIG. 10, assuming that the relations are listed in descending order with the top scoring relations listed first, the top three relations would be "spoke>manager", "called>manager" and "spoke with>supervisor". The theme name can be created from the terms in these three relations, for example by pairing the terms of the relations so that each of the first terms of the relation are listed together and each of the second terms are listed together. Implementing such a method, the theme name 940 for the theme in FIG. 10 could be, for example, "spoke, called, spoke with > manager, supervisor". In still other embodiments, the terms of the top relations could be collected and concatenated in other ways. The purpose of using more than the top relation in the theme name may be to ensure that the entire sentiment or idea of the theme is expressed. The top relation in the dataset may not be enough to encompass the entire idea of the theme, and thus using two or more of the top relations may lead to more accurate names. However, using multiple relations to create the names may lead to longer, more cumbersome names that are hard to incorporate into user interfaces. Thus, it may be desirable to use shorter names based on the top relation in certain analytics functions or displays, while using the longer, potentially more accurate names in other analytics functions or displays.

Further detail may be added to the display to convey additional information about the theme. For example, the strength of the connections between words is illustrated by the thickness of the line. The terms could be grouped by entity, so that, for example, all of the "objects" are aligned in one column and connected with all of the "actions" aligned in another column. Additionally, each relationship, or connection between terms, could be labeled or described. For example, connections between employees and customers they have served can be identified as a particular relationship. Other relationships might be identified as being related to a complaint, related to a contractual obligation (e.g. a warranty or service contract), etc.

Additionally, multiple themes can be viewed at one time. For example, all of the themes represented in a corpus may be displayed. Alternatively, a portion of the themes could be displayed, such as the most common themes or the themes most related to a particular term or theme, such as a term or theme identified by a user. In one embodiment, depicted in FIG. 11, themes can be viewed in a Theme Visualization Tree Map 1010. Any number of user interface mechanisms can be employed to allow a user to interact with and display the tagged data, and the interface mechanisms can be designed to incorporate any number of data formats according to what type of data is incorporated in the communications data set. As demonstrated in FIG. 11, the Tree Map 1010 provides users with a tool to visualize customer service call data. Using the Tree Map 1010, user can select different views of the same data related to themes 926 and their associated relations 928. By selecting different performance metrics, filtering the data set to view related themes, and drilling down to view detailed information about a specific theme, the user can gain different perspectives on the data. In still other embodiments, the theme visualization could be in a list view, wherein theme data is displayed in a table format. Such a table could include theme names, the number of interactions with which each theme is associated, the percentage of the interactions in the data set in which each theme appeared, the relations associated with that theme, and the importance of that theme in signifying or representing the overall purpose of the interaction.

As seen in FIG. 11, the user can use the Tree Map 1010 to view theme performance according to certain selected metrics 1012. This exemplary communication data regarded in FIG. 11 regards customer service call data, and the exemplary metrics regarded in the display are "average position in call" and "number of calls." However, it is contemplated that the Tree Map display could be applied to any number of metrics regarding any type of data, including duration of interaction associated with a theme or percentage of silence (period where neither employee or customer is communicating) associated with a theme 909. The Tree Map 1010 employs a color/size coding scheme to convey information about themes 909 according to the selected metrics. In FIG. 11, themes found in a relatively high number of calls are displayed in a relatively large cell, whereas themes that rarely appeared are displayed in relatively small cells. Color coding is used to show where the themes fell within the span of the calls in the processed data set. For example, cells shaded orange and/or or red could be used to represent themes that typically appeared relatively early in the call, whereas yellow and/or green could represent themes that typically fell relatively late in the call. In some embodiments, the Theme Visualization Tree Map 1010 (or any other display mechanism) can be employed to allow a user to view theme statistics, view and/or play snippets of a communication, or filter and chart themes or theme statistics.

Additionally, themes can be used by analytic algorithms to identify larger events, or flows, which can be identified by a series of themes appearing in an identifiable order. The theme patterns represent courses of action or a series of events. In one embodiment, the flow identification may begin by identifying a specific triggering theme, or event, and then assess differing patterns that flow from that triggering event. In this funnel analysis, identification of the triggering event and identification of the resulting patterns can both be achieved by locating certain themes and theme patterns. The flow identification can be quite specific, allowing the system to single out specific events, actions, or action categories, automatically identify one or more resultant patterns that follow that specific event or action. Once the theme patterns have been identified, a user can leverage the system to analyze the effectiveness of those theme patterns, or courses of action. Thereby, the user can leverage the information provided by the disclosed ontology analytics 704 to adjust its behavior to repeat the most successful actions and avoid unsuccessful ones. Additionally or alternatively, the system may automatically use the funnel analysis to examine datasets to determine, for example, to determine the percentage of calls relating to a certain theme or group of themes—i.e. what percent of the dataset went through which funnels. Likewise, the system may utilize the funnel analysis to assess particular subsets of data, such as data from a certain time period or involving a particular individual or entity, to automatically obtain desirable information.

For example, in a call center application, user companies can automatically assess large datasets to obtain important statistical data about call patterns. The system can identify particular events, or interactions, initiated by a customers and/or a customer service agent and that assess how those actions are being handled and the success rates and outcomes of the different resultant patterns, or courses of action. For example, by assessing the themes identified in a processed dataset, call flows can be identified in the dialogue between a customer service representative and a customer—e.g., discussions regarding cancelling a service, discussions regarding a billing error, discussions regarding upgrading or changing a service. The funnel analysis will automatically assess multiple calls involving the identified theme, or theme pattern, and then may process that call data to determine useful information, such as which calls had successful outcomes and which ones did not. For example, the system may identify customer service calls wherein the customer requests to cancel their service by identifying call data wherein particular related themes appear, such as cancel>service, stop>service, cancel>plan, leave>company, etc. Then, once those customer services calls have been identified, the system may identify, for example, which approaches by customer service agents resulted in retaining the customer.

In one embodiment, the identified data sets including the triggering event can be assessed to determine what caused the event, what actions followed from the event, and/or what conclusion or result flowed from the triggering event. Following on the above explanatory example, call sets containing themes regarding cancelling a service can be assessed and further separated based on, for example, what caused the customer to want to cancel the service, what course of action the customer service agent took in response to the customer's cancellation request, and/or how the interaction resolved—e.g. whether the customer successfully cancelled the service or decided to continue the service instead. For example, a company that offers cable service may wish to identify and assess calls relating to customer requests to cancel their cable service to determine what actions by customer service agents successfully caused such customers to change their mind and keep their service. For example, the system might identify theme patterns relating to particular financial incentives, such as offering of free services or equipment. Likewise, the system might identify other theme patterns relating to identification of the reason for cancellation, and/or themes relating to proposals or solutions for counteracting the customer's dissatisfaction.

Patterns, or flows, of themes can be identified using a funnel analysis, where the system reviews a user's dataset to identify subsets of data that have at least a threshold degrees of similarity in their theme patterns. As mentioned above, the funnel analysis may begin by identifying one or more particular themes in a dataset. Preferably, a dataset is comprised multiple communication interactions, such as multiple customer service interactions, each having been processed utilizing a specially tailored ontology as described above. FIG. 12 provides an abbreviated logic grid for an exemplary funnel analysis related to this exemplary customer service assessment. As described above, the ontology system would be leveraged to process the company's customer service data to identify datasets involving themes relating to canceling service. Referring to the figure, step 1101 is identifying data subsets containing a customer states an intent to disconnect can be done by identifying particular themes involving cancelling. Then, the communication interactions, or data subsets, containing the identified theme may then be further analyzed to identify other themes that followed from the triggering theme. At 1102, for example, the system assesses the identified interactions to determine whether the customer service agent offers a "free receiver" as the first reaction to the customer's cancellation request. Likewise, at 1103, the system analyzes whether the agent offers a "free receiver" as the second, or "fallback", reaction.

In an alternative embodiment, the data subsets are processed by the system to identify the theme patterns, or series of themes, for in each subset. The theme patterns for each data subset, such as for each customer service interaction, may then be compared to one another and common patterns identified. Those common patterns might be separately stored and be searchable or reviewable with a user interface such that allows a user to identify groups of theme patterns for analysis.

In still other embodiments, a communication data set can be processed to identify a triggering theme. Then, data subsets can be created around the identified triggering themes by taking a predetermined amount of data occurring before and after each identified instance. For example, in call center data, the data subset could be created as 1 minute of data on either side of the identified theme occurrence. Alternatively, if the communication data is written, such as transcribed audio data or a web chat, the data subset could be created as a particular number of words before and after the theme appearance, or a particular number of back and forth interactions between the agent and the customer. Once the subsets are identified, they can be processed according to any of the above-described methods to identify the theme patterns therein.

Accordingly, data subsets having the same patterns, or series, of themes are funneled together. For instance, in the provided example, groups of data wherein the customer seeks to cancel their cable and then the customer service agent offers a "free receiver" as the first reaction can be grouped and assessed together. This allows for analytics to be performed on the similar data subsets so that a user can collect useful metrics. Following on the example, the user could assess the "free receiver" data group to determine the success rate of that offer in retaining customers—i.e., what percentage of customers change their mind regarding cancellation after being offered a free receiver.

Figure 13:
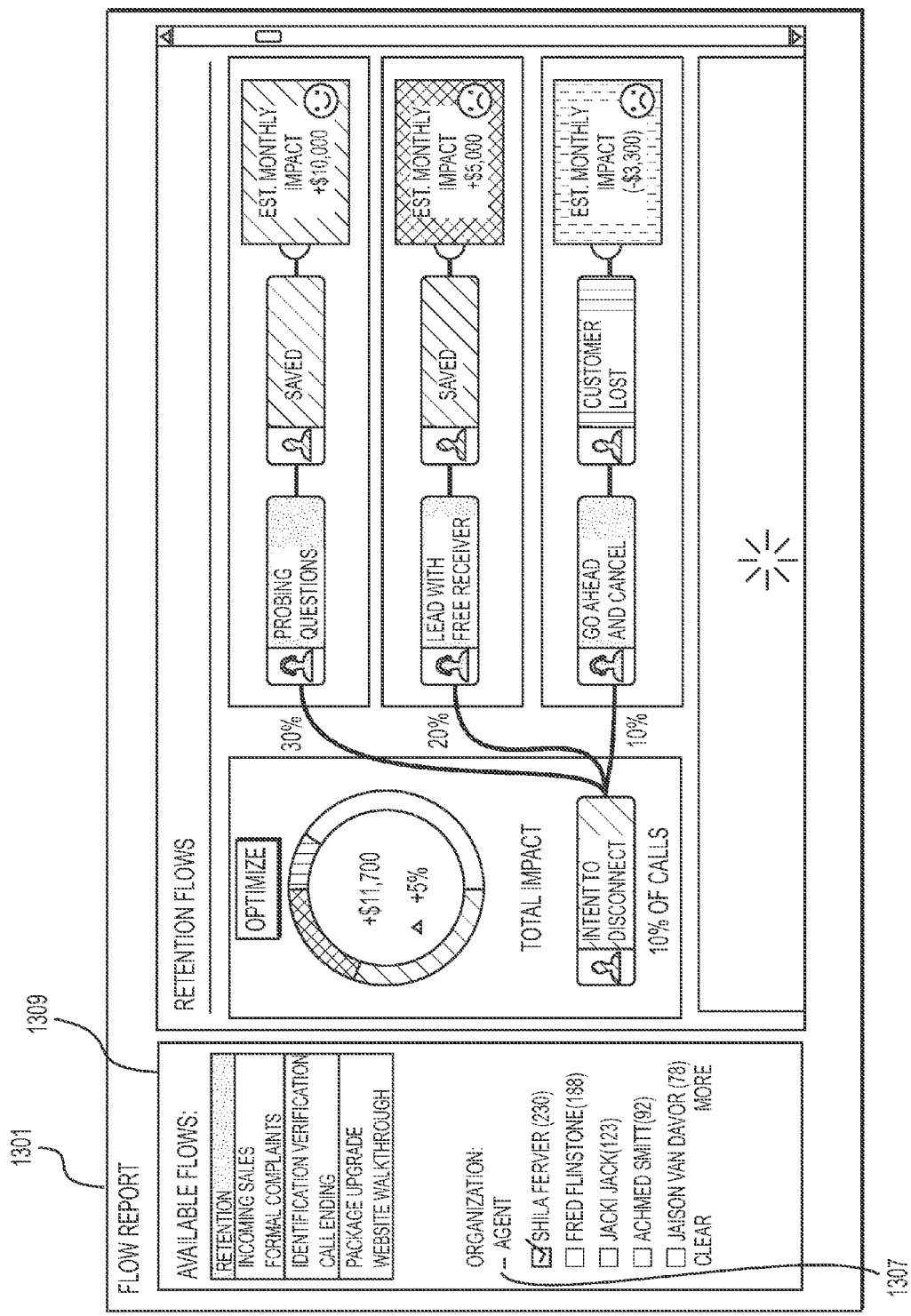
FIG. 13 provides an exemplary user interface display providing the results of one embodiment of an analytics module applying a funnel analysis.

This type of inquiry can be conducted regarding any identified triggering theme, or event, for any dataset to identify a theme pattern, or flow of events, for each interaction. The interactions can then be grouped and other statistical and or data assessments can be performed to report a multitude of useful data according to the users' needs. Sticking with the same example, FIG. 13 demonstrates one potential output to a user that could be provided by an analytics module or program utilizing a funnel analysis, such as the analysis depicted in FIG. 13. The depicted user interface is a flow report 1201 that conveys data regarding the interactions, or flows, that followed after a customer expressed an "intent to disconnect." This flow report 1201, titled "Retention Flows", displays statistical data regarding three courses of action taken by one or more customer service agents 1207 within the dataset in reaction to a customers' request to cancel service—47% of the events were handled by asking "questions" (such as to determine the reason for the desire to cancel), 10% calls were handled by offering a free receiver, and 3% of the calls were handled by heeding the request to cancel and carrying out the action. Further, as demonstrated in the figure, additional analysis can be provided for any given set, or flow, of themes within a dataset. FIG. 13 provides the exemplary data of "estimated impact", which is the estimated financial result of the actions taken by the agent. Alternatively or additionally, the system and disclosed funnel analysis may be utilized to provide any number of useful assessments of a user's communication data. For example, the system may automatically assess the performance of customer service agents 1207, or may automatically assess customer service data for a particular time period or a particular call center location.

The call center application is just one exemplary application of the disclosed funnel data analysis applied in one type of industry. This theme-based funnel analysis could be applied to any type of dataset utilizing that user's ontology to surface a multitude of analytical data that could be leveraged by a company to improve its work flows. A company may, for example, utilize this funnel analysis to construct best practice guidance for its employees. Alternatively or additionally, this funnel analysis could be conducted real-time to provide guidance to user employees regarding solutions to the problems they are facing.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of automated discourse analysis of interaction transcriptions, the method comprising;
    receiving, by at least one processor, a plurality of interaction transcriptions;
    for each respective interaction transcript of the plurality of interaction transcriptions:
        executing, by the at least one processor, a zoning process that segments utterances of the respective interaction transcript into a plurality of meaning units;
        classifying, by the at least one processor, the plurality of meaning units into dialog acts using a trained dialog act classifier, the dialog acts include at least the following categories: social, information, request, response and repetition, the repetition category being used to identify a repetition of a immediately previous dialog act when one party to a given interaction repeats a meaning unit previously spoken by another party to the given interaction, wherein the dialog act classifier is trained by at least preparing a training file in Attribute-Relation File Format (ARFF) for Waikato Environment for Knowledge Analysis (WEKA) in which each row in the training file includes data about a single respective meaning, unit, and then applying Naïves Bayes to build the classifier from the training file; and
        identifying, by the at least one processor, durations between the dialog acts;
    selecting, by the at least one processor, a subset of the plurality of interaction transcriptions based on the durations;
    extracting, by the at least one processor, syntactic patterns from the selected subset; and
    outing, by the at least one processor, the extracted patterns as a visual presentation on a graphical display.

2. The method of claim 1, further comprising selecting, by the at least one processor, the subset with long call duration.

3. The method of claim 1, further comprising selecting, by the at least one processor, the subset with the longest identified durations between dialog acts.

4. The method of claim 2, wherein the extracted patterns include an identification of the agent or group of customer service agents represented in the selected subset with long call duration.

5. The method of claim 2, wherein the extracted patterns include an identification of a reason for call length of the selected subset with long call duration and an indication of which particular topics, events or dialog acts are most likely to result in abnormally long calls.

6. The method of claim 3, wherein the extracted patterns include an identification of the agent or group of customer service agents represented in the selected subset with the longest identified durations between dialog acts.

7. The method of claim 3, wherein the extracted patterns include an identification of a reason for call length of the selected subset with the longest identified durations between dialog acts and an identification of which dialog acts are most likely to result in abnormally long calls.

8. The method of claim 1, further comprising selecting, by the at least one processor, the subset that resulted in a sales outcome.

9. The method of claim 1, wherein the extracted patterns include an identification of how a call results in an upsell start.

10. The method of claim 1, further comprising selecting, by the at least one processor, the subset that resulted in a cancellation outcome.

11. The method of claim 10, wherein the extracted patterns include an identification of what is the call flow of a call that results in a cancellation.

12. The method of claim 1, further comprising selecting, by the at least one processor, the subset by processing the plurality of interaction transcriptions to identify a triggering theme and then creating the subset around the identified triggering theme.

13. The method of claim 12, wherein the subset is created as a particular number of words before and after the trigger theme appearance.

14. The method of claim 12, wherein the subset is created as a particular number of back and forth interactions between an agent and a customer.

15. A non-transitory computer-readable medium having instructions that when executed by a hardware processor, cause the processor to perform a method comprising;
    receiving a plurality of interaction transcriptions;
    for each respective interaction transcript of the plurality of interaction transcriptions:
        executing a zoning process that segments utterances of the respective interaction transcript into a plurality of meaning units;
        classifying the plurality of meaning units into dialog acts using a trained dialog act classifier, the dialog acts include at least the following categories: social, information, request, response and repetition, the repetition category being used to identify a repetition of a immediately previous dialog act when one party to a given interaction repeats a meaning unit previously spoken by another party to the given interaction, wherein Attribute-Relation File Format (ARFF) for Waikato Environment for Knowledge Analysis (WEKA) in which each row in the training file includes data about a single respective meaning unit, and then applying Naïves Bayes to build the classifier from the training file; and
        identifying durations between the dialog acts;
    selecting a subset of the plurality of interaction transcriptions based on the durations;

extracting syntactic patterns from the selected subset; and
outing the extracted patterns as a visual presentation on a graphical display.

16. The non-transitory computer-readable medium of claim 15, wherein the method further comprises selecting the subset with long call duration.

17. The non-transitory computer-readable medium of claim 15, wherein the method further comprises selecting the subset with the longest identified durations between dialog acts.

18. The non-transitory computer-readable medium of claim 15, wherein the method further comprises selecting the subset that resulted in a sales outcome.

19. The non-transitory computer-readable medium of claim 15, wherein the method further comprises selecting the subset that resulted in a cancellation outcome.

20. The non-transitory computer-readable medium of claim 15, wherein the method further comprises selecting the subset by processing the plurality of interaction transcriptions to identify a triggering theme and then creating the subset around the identified triggering theme.

* * * * *